United States Patent
Di Benedetto et al.

(10) Patent No.: US 9,602,331 B2
(45) Date of Patent: Mar. 21, 2017

(54) SHARED INTERFACE AMONG MULTIPLE COMPUTE UNITS

(71) Applicant: Cisco Technology, Inc., San Jose, CA (US)

(72) Inventors: Marco Di Benedetto, Santa Clara, CA (US); Mario Baldi, Cuneo (IT); Vijay Chander, San Ramon, CA (US); Alessandro Salvatori, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 370 days.

(21) Appl. No.: 13/665,662

(22) Filed: Oct. 31, 2012

(65) Prior Publication Data

US 2014/0122743 A1    May 1, 2014

(51) Int. Cl.
*G06F 15/16*     (2006.01)
*H04L 29/10*     (2006.01)
*H04L 29/06*     (2006.01)

(52) U.S. Cl.
CPC .............. *H04L 29/10* (2013.01); *H04L 69/12* (2013.01); *H04L 69/22* (2013.01)

(58) Field of Classification Search
CPC . H04L 12/4633; H04L 69/16; H04L 61/2007; H04L 29/06312; H04L 65/1063; H04L 63/08; H04L 63/0876; H04L 29/10; H04L 69/12; H04L 69/22; H04W 4/003
USPC ........................................................ 709/250
See application file for complete search history.

(56) References Cited

U.S. PATENT DOCUMENTS

| | | | |
|---|---|---|---|
| 5,883,890 A * | 3/1999 | Okanoue et al. ............. 370/338 |
| 6,618,397 B1 * | 9/2003 | Huang .......................... 370/474 |
| 2003/0188019 A1 * | 10/2003 | Wesley ......................... 709/245 |
| 2004/0010683 A1 * | 1/2004 | Huitema ....................... 713/162 |
| 2005/0053060 A1 * | 3/2005 | Pettey .......................... 370/385 |
| 2009/0300605 A1 * | 12/2009 | Edwards et al. .................. 718/1 |
| 2011/0090851 A1 * | 4/2011 | Khalil et al. ................. 370/328 |
| 2011/0134920 A1 * | 6/2011 | Dyke ..................... H04L 45/60 370/392 |

* cited by examiner

*Primary Examiner* — Oleg Survillo
*Assistant Examiner* — Tan Doan

(57) ABSTRACT

Providing a shared interface among a plurality of compute units is disclosed. A plurality of compute units is determined and a shared interface for the plurality of compute units is provided, wherein incoming traffic is received by any of the plurality of compute units. Also, the packet is received at the shared interface for a plurality of compute units. The packet is encapsulated using a first header, wherein the first header specifies one of the plurality of compute units, and wherein the one of the plurality of compute units is selected independent of an interface address associated with the shared interface.

22 Claims, 24 Drawing Sheets

| Buckets | | |
|---|---|---|
| Bucket a | Data plane ~~1~~ 6 | Flows C, L |
| Bucket b | Data plane 2 | Flows D, M |
| Bucket c | Data plane ~~3~~ 6 | Flows A, O |
| Bucket d | Data plane 5 | Flows B, K |
| Bucket e | Data plane 3 | Flows E, Q |
| Bucket f | Data plane 4 | Flows H, W |
| Bucket g | Data plane 1 | Flows I, N |
| Bucket h | Data plane 4 | Flows G, V |

1002

|  | Current and Predecessor Data Planes | | |
|---|---|---|---|
|  | Current | 1st Predecessor | 2nd Predecessor |
| Bucket a | Data plane 6 | Data plane 1 | N/A |
| Bucket b | Data plane 2 | N/A | N/A |
| Bucket c | Data plane 6 | Data plane 3 | N/A |
| ⋮ |  |  |  |
| Bucket r | Data plane 1 | N/A | N/A |
FIG. 11A
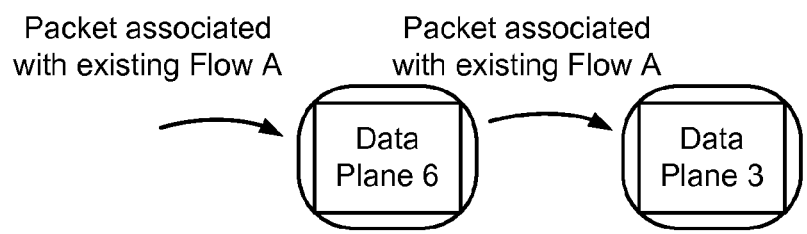
FIG. 11B
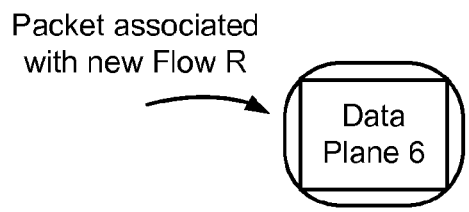
FIG. 11C

|  | Current and Predecessor Data Planes | | |
|---|---|---|---|
|  | Current | 1st Predecessor | 2nd Predecessor |
| Bucket a | Data plane 3 | Data plane 6 | N/A |
| Bucket b | Data plane 2 | N/A | N/A |
| Bucket c | Data plane 4 | N/A | N/A |
| Bucket d | Data plane 5 | N/A | N/A |
| Bucket e | Data plane 1 | N/A | N/A |

| RSVD (24) | TABLE (4) | TRR (2) | ERA (2) | SNODE (12) | HANDOFF TYPE (4) | HOOK (4) |
|---|---|---|---|---|---|---|
| | | | | IFID (8) | | |
| Optional nid0 (16) | | | | | | |
| Optional nid1 (16) | | | | | | |

⋮

| Optional nidN-1 (16) |
|---|
| Optional nidN (16) |

| HDR SIZE (6) | ERA (2) | SNODE (16) | IFID (8) | TTL (8) | TYPE = 1 | RSVD (4) |
|---|---|---|---|---|---|---|
| | | | | HOOK (4) | HOOK TBL (4) | RSVD (8) |
| Optional nid0 (16) | | | | Optional nid1 (16) | | |
| ... | | | | ... | | |
| Optional nidN-1 (16) | | | | Optional nidN (16) | | |

SHARED INTERFACE AMONG MULTIPLE COMPUTE UNITS

BACKGROUND OF THE INVENTION

Typically, an interface address (e.g., a media control access address) is assigned to a single device (node) within a network. The interface address serves as a unique identifier for the device such that the device may be distinguished from other devices on the same local network by its interface address, for example.

BRIEF DESCRIPTION OF THE DRAWINGS

Various embodiments of the invention are disclosed in the following detailed description and the accompanying drawings.

FIGS. 11A, 11B, and 11C illustrate examples of updating a history table in association with the addition of a new data plane compute unit to a DVA and the reallocation of network traffic in the DVA in accordance with some embodiments.

FIG. 18 is a diagram showing a first example of a second header included in an encapsulation for a packet in accordance with some embodiments.

FIG. 20 is a diagram showing a second example of a second header included in an encapsulation for a packet in accordance with some embodiments.

DETAILED DESCRIPTION

Figure 1:
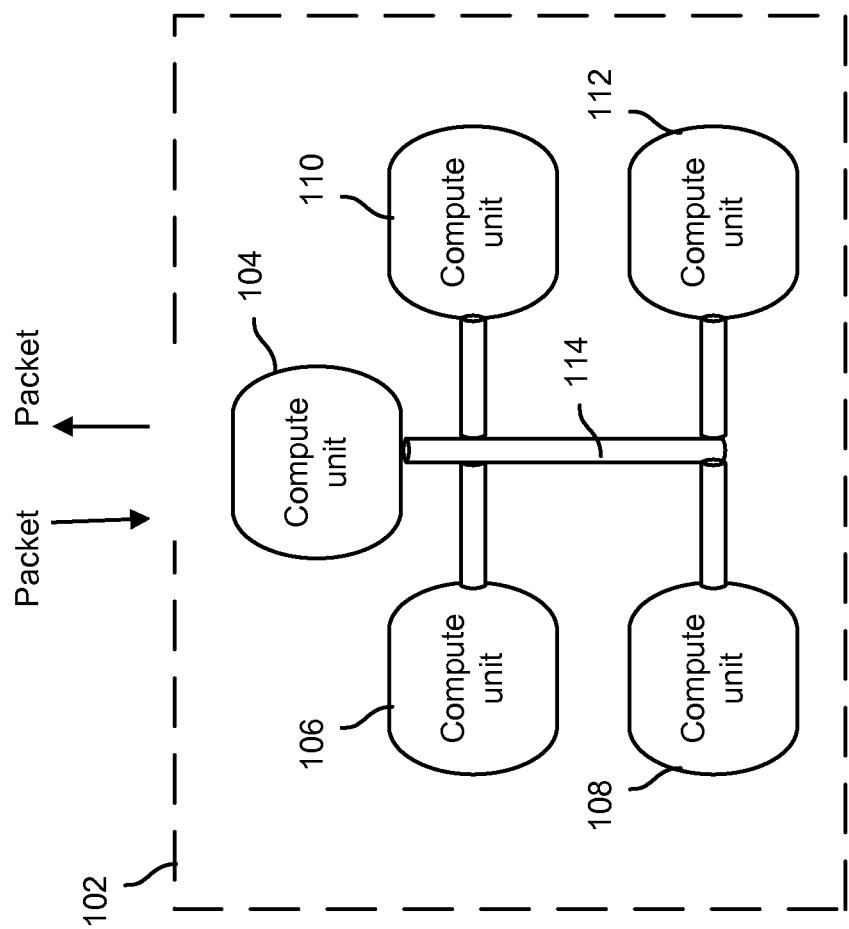
FIG. 1 is a diagram showing an example of a set of compute units associated with a shared interface in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Sharing a network interface among multiple compute units is described herein. In various embodiments, a compute unit may comprise a virtual or physical resource. For example, a compute unit that comprises a virtual resource may comprise one or more virtual machines (VMs). In various embodiments, sharing a network interface among multiple compute units includes assigning each of the set of multiple compute units associated with the shared network interface the same interface address (e.g., a media access control (MAC) address). A packet that is received at the shared interface (e.g., the packet was sent to the address associated with the shared interface) is processed by the set of compute units associated with the shared interface. In some embodiments, a mechanism associated with the shared interface applies a specially configured tunneling protocol to the packet by encapsulating the received packet using at least one shared interface associated header. The encapsulated packet is then distributed by the mechanism to at least one compute unit associated with the shared interface for the compute unit to process the encapsulated packet. For example, the mechanism associated with encapsulating and/or distributing the packet to a compute unit that is configured to process packets may be implemented by another compute unit that is configured to perform such tasks. In some embodiments, the compute unit to which the packet was originally distributed may keep and process the packet (e.g., based on a function that the set of compute units associated with the shared interface are configured to perform) or punt the packet to another compute unit associated with the shared interface for this other compute unit to process the packet. In some embodiments, data associated with at least the origin and destination of the packet as well as the state of the packet since having been received at the shared interface is included/updated within the encapsulation of the packet. In some embodiments, regardless of which compute unit associated with the shared interface ultimately processes or determines that the packet cannot be processed by the set of compute units, the encapsulation of the packet is removed and the packet is sent out of the shared interface with a single source interface address, as if the packet had been processed and sent out by a single device. In some embodiments, at least some of the multiple compute units within the set associated with the shared interface are configured to be able to process in parallel such that different flows of network traffic received at the shared interface may be processed at least partially concurrently by the compute units of the shared interface.

FIG. 1 is a diagram showing an example of a set of compute units associated with a shared interface in accordance with some embodiments. As shown in the example, set of compute units 102 includes compute units 104, 106, 108, 110, and 112. Set of compute units 102 is associated with a shared interface. Each of compute units 104, 106, 108, 110, and 112 may be implemented with one or more virtual or physical resources. For example, at least one of compute units 104, 106, 108, 110, and 112 may be implemented by one or more VMs. Each of compute units 104, 106, 108, 110, and 112 included in set of compute units 102 is associated with the same interface address (e.g., MAC address). For example, any packet (e.g., an Ethernet frame) that is destined for (e.g., to be received at) set of compute units 102 is associated with the shared interface address and any packet that originates and/or is sent from set of compute units 102 is associated with the shared interface address. In some embodiments, set of compute units 102 is associated with performing at least one network function (e.g., firewall, router, intrusion detection system, load balancing). In some embodiments, a mechanism associated with set of compute units 102 is configured to apply a specially configured tunneling protocol to the packet by encapsulating the packet with an encapsulation configured to accommodate the use of a shared interface among compute units 104, 106, 108, 110, and 112. Accommodating the use of a shared interface among compute units 104, 106, 108, 110, and 112 includes enabling communication between the compute units. For example, the encapsulation may include at least one header that is added to the packet.

The encapsulated packet is sent and received between compute units 104, 106, 108, 110, and 112 over tunnel 114. Tunnel 114 may be configured to be secure or not secure. In some embodiments, the former or another mechanism associated with set of compute units 102 is configured to distribute a packet received at the shared interface to at least one of compute units 104, 106, 108, 110, and 112 for the compute unit to process the packet. Each of compute units 104, 106, 108, 110, and 112 may be associated with the same or different processing capacity. In the event that a compute unit of set of compute units 102 includes a VM, then the processing capacity of the VM may depend on the hardware from which it was provisioned. In some embodiments, the mechanism is configured to distribute the encapsulated packet based at least in part on one or both of the encapsulation of the packet and/or the packet itself. In some embodiment, the mechanism(s) configured for encapsulating and/or distributing the packet may be implemented by at least one of compute units 104, 106, 108, 110, and 112 that are configured to perform such tasks. In some embodiments, and will be further described below, the compute unit(s) of set of compute units 102 to which the packet was originally distributed may either keep and process the packet (e.g., based on the network function configured for set of compute units 102) or punt the packet to another compute unit of set of compute units 102 for the next compute unit(s) to process the packet. In some embodiments, the encapsulated packet may be processed and/or distributed/punted but not processed by one or more of compute units 104, 106, 108, 110, and 112 before it is sent out of set of compute units 102 to a destination external to set of compute units 102. Prior to sending the packet (e.g., the processed packet or the packet having been determined by set of compute units 102 to not be capable of being processed by set of compute units 102), the encapsulation generated for the packet is removed.

In some embodiments, at least some of compute units 104, 106, 108, 110, and 112 may be processing packets associated with different flows of network traffic in parallel because the packets associated with the different flows may be distributed and ultimately processed by different compute units of the set. For example, each flow of network traffic includes packets associated with at least some common information within the packet header (e.g., Ethernet frame header or UDP header or TCP header) of the packet. In some embodiments, more compute units may be added to set of compute units 102 (e.g., in anticipation of a need for increased processing capacity across the set). In some embodiments, one or more compute units may be removed from set of compute units 102 (e.g., after the observation that less processing capacity is needed by the set). In some embodiments, in response to each modification (e.g., the addition or removal of compute units) to set of compute units 102, a data structure (e.g., hash table or a vector) associated with mapping the association between compute units and the particular flow(s) of network traffic that each compute unit is to receive is updated or replaced by a new data structure that reflects the modification, as will be further described below.

Figure 2:
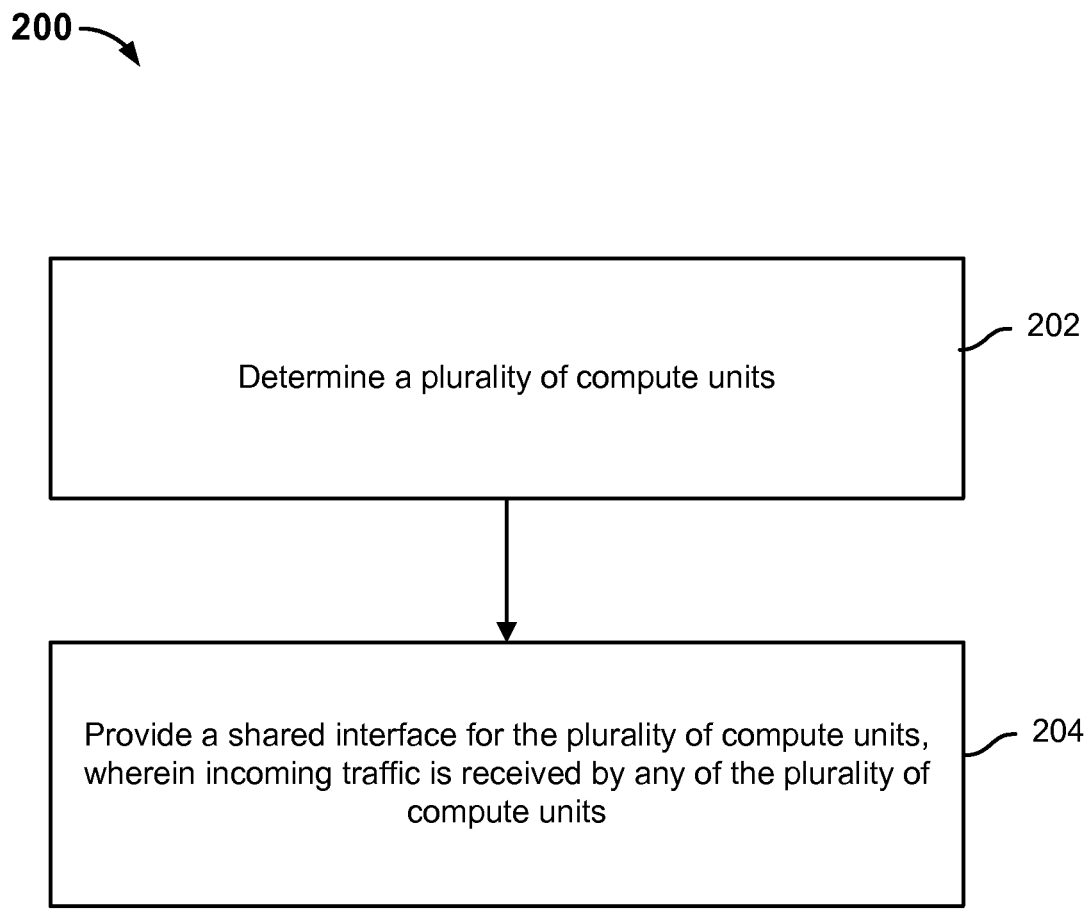
FIG. 2 is a flow diagram showing an example of a process for providing a shared interface in accordance with some embodiments.

FIG. 2 is a flow diagram showing an example of a process for providing a shared interface in accordance with some embodiments. In some embodiments, process 200 may be implemented at set of compute units 102.

At 202, a plurality of compute units is determined. In some embodiments, a set of more than one compute units is determined to be associated with a shared interface. In some embodiments, each of the compute units of the set includes a VM provisioned from one or more hardware devices.

At 204, a shared interface for the plurality of compute units is provided, wherein incoming traffic is received by any of the plurality of compute units. In some embodiments, the set of compute units may each be configured to perform one or more network functions and/or include one or more attributes. In some embodiments, some of the compute units of the set may be associated with one type of role associated with performing the configured network functions and some other of the compute units of the set may be associated with another type of role associated with performing the configured network functions. For example, one type of role may include the tasks of encapsulating a packet, distributing the encapsulated packet to another compute unit associated with a different role of performing the network functions, and removing encapsulation from an encapsulated packet. Since all the compute units of the set are associated with the same shared interface address, a packet sent to the shared interface address may be received and/or processed by any of the compute units of the set. In some embodiments, the number of compute units in the set may increase or decrease (as more or less processing capacity is desired), without disrupting the distribution of the same flow of network traffic to the set of compute units. In some embodiments, the shared interface may be remote from the set of compute units. For example, a compute unit may comprise a virtual machine running on a physical host. The interface being remote means that it is not one of the interfaces of the virtual machine (that emulates a computer with processor, memory, disk, interfaces, for example) and or one of the interfaces of the physical (as opposite to virtual) computer on which the virtual machine is emulated. In other words, what happens is that by using a remote interface a (virtual) computer can use an interface that is not part of it as if the interface were a part of it.

Figure 3:
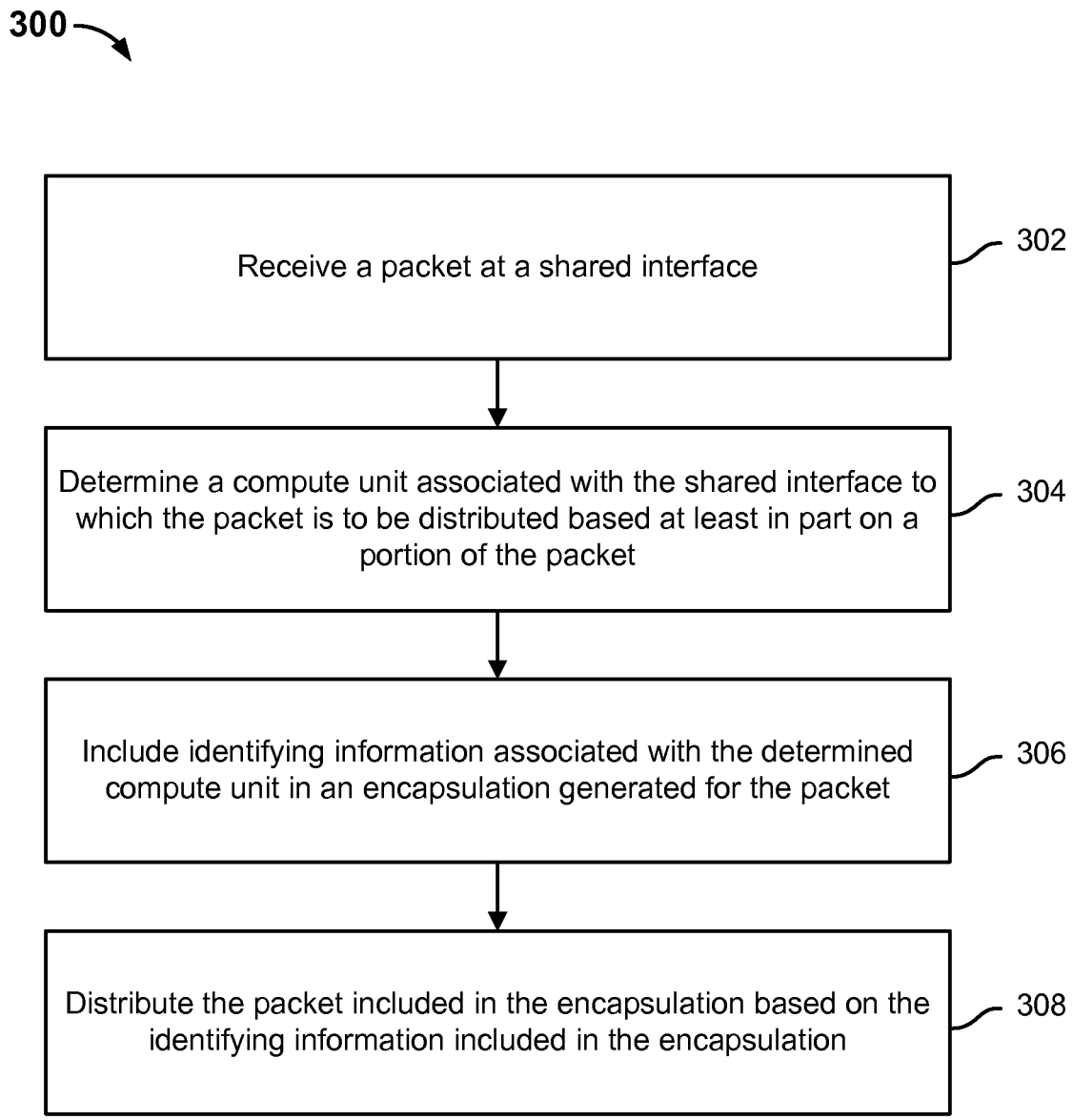
FIG. 3 is a flow diagram showing an example of a process for distributing a packet received at a shared interface in accordance to some embodiments.

FIG. 3 is a flow diagram showing an example of a process for distributing a packet received at a shared interface in accordance to some embodiments. In some embodiments, process 300 may be implemented at set of compute units 102.

At 302, a packet is received at a shared interface. For example, the packet may include an Ethernet frame. In some embodiments, the interface is shared among multiple compute units. For example, each compute unit may be implemented with one or more VMs. The packet may be sent from a source external to the set of compute units. The packet sent to the address associated with the shared interface may be received by one of the compute units associated with the shared interface. For example, this compute unit may be configured to be associated with a first type of role that causes the compute unit to receive ingress packets and distribute them to other compute units associated with the shared interface, where these other compute units may each be configured to be associated with a second type of role that causes the compute unit to process a packet in a manner associated with a particular network function. In some embodiments, the compute unit associated with the first type of role that causes the compute unit to receive ingress packets and distribute them to other compute units associated with the shared interface does not alter the shared interface address associated with the packet before distributing them but rather distributes the packets based on, for example, hashing data extracted from the packets.

At 304, a compute unit associated with the shared interface to which the packet is to be distributed is determined based at least in part on a portion of the packet. In some embodiments, the compute unit that is configured to distribute the packet determines another compute unit associated with the shared interface to which the packet is to be distributed based on a set of policies and/or a distribution function. For example, the set of policies and/or distribution function may be implemented using a hash function, where the input into the hash function includes at least a subset of the information included in the packet header (e.g., the Ethernet header of the Ethernet frame) and the output of the hash function is information associated with a particular compute unit (included within the set of compute units that share the interface) to which the packet is to be distributed. By using the hash function, packets associated with the same flow of network traffic will be consistently hashed to the same compute unit so that compute units may process all packets of the same network flow. In some embodiments, in response to the modification of the compute unit make-up of the set of compute units that share the interface, a data structure (e.g., hash table) associated with the set of policies and/or distribution function is updated or replaced with a new data structure.

In some embodiments, prior or subsequent to determining a compute unit to which the packet is to be distributed, the packet is encapsulated using a tunneling protocol specially configured for shared interfaces as described herein. In some embodiments, encapsulating the packets includes prepending at least one additional header to the packet (e.g., Ethernet frame).

At 306, identifying information associated with the determined compute unit is included in an encapsulation generated for the packet. In some embodiments, each compute unit associated with a shared interface is associated a node ID (e.g., the node ID is unique among the set of compute units that share the same interface). In some embodiments, the node ID of the compute unit to which the packet is to be distributed is included in one of the headers associated with the encapsulation. In some embodiments, the node ID of the compute unit from which the packet is to be sent is also included within one of the headers associated with the encapsulation.

At 308, the packet included in the encapsulation is distributed based at least in part on the identifying information included in the encapsulation. In some embodiments, the encapsulated packet is distributed to the determined compute unit across a tunnel based on the node ID of the compute unit to receive the packet that is included in the encapsulation.

In some embodiments, the set of compute units associated with a shared interface is included in a distributed virtual appliance. As will be discussed in further detail below, a distributed virtual appliance (sometimes referred to herein as a DVA) is configured to perform at least one network service. In various embodiments, the compute units of the set that is allocated to a particular DVA are configured to coordinate among themselves to perform the functions (e.g., of one or more network services) associated with the DVA. Put another way, a DVA is a logical container that includes the set of compute units allocated to it and the compute units of the set work in concert to provide the functions of the network service associated with the DVA. In various embodiments, the set of compute units allocated to a DVA maintain consistent allocation of network traffic to those of the compute units at which, for example, the traffic is to terminate. In some embodiments, each compute unit included in a set of compute units allocated to a DVA can be associated with an identifier associated with that DVA. In various embodiments, generally, the more compute units that are allocated to a DVA, the more processing capacity the DVA has. Conversely, generally, the fewer compute units that are allocated to a DVA, the less processing capacity the DVA has. For a DVA, compute units can be dynamically (e.g., elastically) added when the DVA requires more processing capacity and also dynamically removed when the DVA requires less processing capacity, without disrupting the traffic to the DVA. Furthermore, the availability of unallocated compute units can also be increased by dynamically provisioning more hardware to create more VMs that can be implemented as compute units. In contrast to a conventional network services system that provides a fixed amount of resources dedicated to performing one function, the DVA system permits the elastic increase and decrease of resources to better reflect the varying amount of data processing that is actually needed for a network service. In some embodiments, a distributed virtual appliance may be associated with one or more shared interfaces, where each shared interface is associated with at least a subset of the compute units that are included in the distributed virtual appliance.

In various embodiments, each compute unit that is allocated to a particular DVA is configured to assume a certain role (e.g., a data plane, a data planes dispatcher, or a data planes manager), which is explained below.

Figure 4:
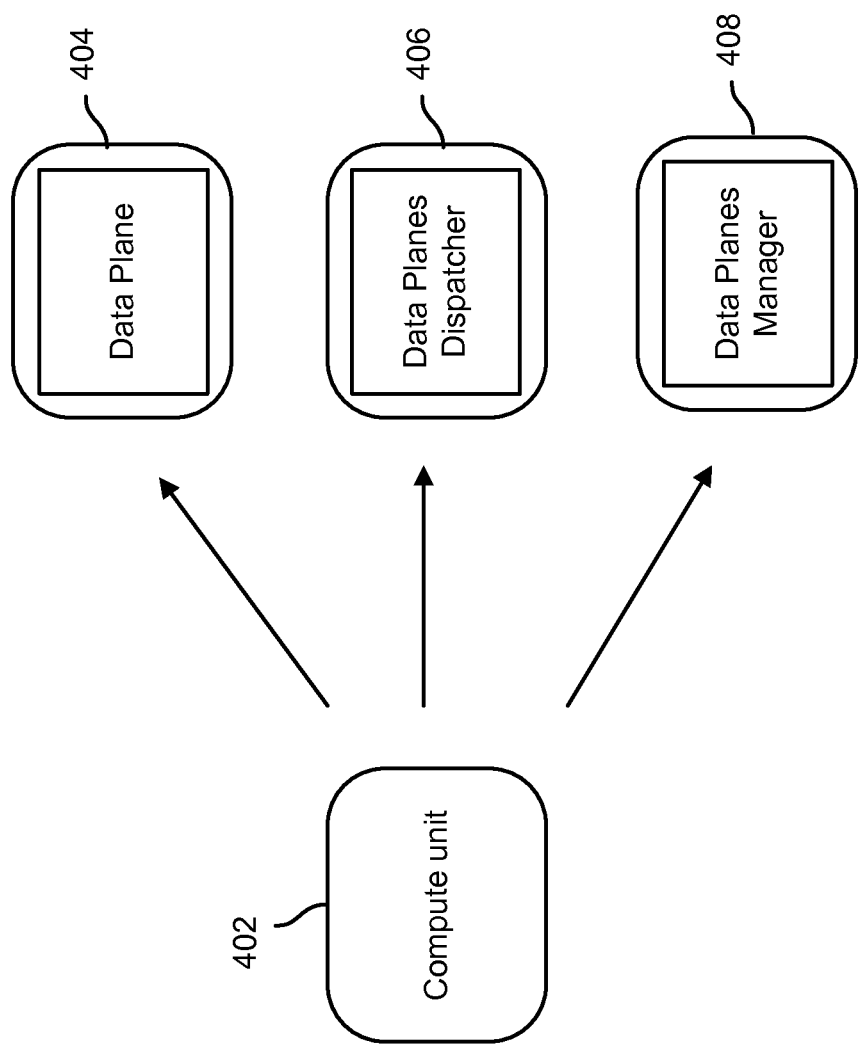
FIG. 4 shows an example of three roles that a compute unit can be configured to assume in accordance with some embodiments.

FIG. 4 shows an example of three roles that a compute unit can be configured to assume in accordance with some embodiments. In some embodiments, a compute unit, such as compute unit 402, can be configured to assume one of the following roles: 1) data plane 404, 2) data planes dispatcher 406, or 3) data planes manager 408. In some embodiments, a compute unit is configured to assume a role each time it is allocated to a DVA. Put another way, for example, the same compute unit can be configured to assume one role, e.g., a data plane, when it is allocated to a first DVA. And subsequently, after the compute unit has been removed from the first DVA, it can be destroyed and its computational resources can be used to form a new compute unit that is configured to assume another role, e.g., a data planes dispatcher, or the same role when the resources are allocated to a second DVA. In some embodiments, a compute unit can be configured to assume more than one role. For the examples of the present application, it is assumed that each compute unit is configured to assume only one role, even though in implementation, a compute unit can take on more than one role.

A data plane compute unit (or sometimes referred to herein as simply data plane) is configured to perform the actual processing of data based on the function (e.g., load balancing, maintaining a firewall, intrusion detecting) of the network service of the DVA with which the data plane compute unit is associated. In some embodiments, a DVA includes multiple data plane compute units. In various embodiments, generally, when a DVA requires more processing capacity, compute units are allocated to the DVA and configured to be data plane compute units. In some embodiments, when it is detected that a DVA requires or will require more processing capacity (e.g., to better handle a current workload or a future increase in workload), one or more compute units configured as data plane compute units can be automatically allocated to the DVA to increase its processing capacity. In some embodiments, when it is detected that a DVA could manage the current workload with less than its current processing capacity, one or more data plane compute units can be automatically removed from the DVA to decrease its processing capacity.

In various embodiments, all data plane compute units associated with the same DVA perform similar tasks that are related to the network service(s) of the DVA. For example, if the network service associated with a DVA is a firewall, then all the data plane compute units associated with that DVA perform data processing related to the functions (e.g., comparing received packets to a set of configured rules, discarding packets, permitting certain packets to pass through) of a firewall. However, not all the data plane compute units associated with the same DVA necessarily have the same processing capacity. As mentioned above, the processing capacity of a compute unit is based on the properties of the hardware from which it was virtualized. Due to the varying processing capacities of the data plane compute units associated with the DVA, each data plane compute unit could process a different capacity of the overall workload associated with the DVA. In some embodiments, the processing capacity of a compute unit depends on a few factors. For example, the capacity of a compute unit depends both on the hardware that is chosen for it to run on and the proportion of resources of that hardware that is allocated to the compute unit. In some embodiments, the processing capacity associated with a compute unit may be configured at the time that the compute unit is provisioned, but an associated hypervisor may make continuous adjustments to the actual capacity at runtime. Therefore, in various embodiments, the DVA to which a compute unit is allocated continuously monitors the performance of a compute unit at runtime to detect the actual processing capacity of that compute unit (e.g., and can adjust the distribution of the network traffic to the compute units based on such monitoring). For example, if five data plane compute units were allocated to a DVA, the total processing capacity of the DVA could be divided as 15%, 30%, 35%, 10% and 10%, respectively, for each of the five data plane compute units at a certain point in time.

In various embodiments, the data plane compute units associated with a DVA work in concert, and also with one or more data planes dispatcher compute units associated with the same DVA, to maintain a non-disruptive flow of network data and to minimize the need to synchronize state information. In various embodiments, the flow of network data is maintained regardless of whether the network data originates from or terminates at the DVA or crosses through the DVA. For example, when network data originates from or terminates at the DVA, that is the case of a DVA that performs the functions associated with a proxy network service. Also, for example, when network data crosses at the DVA, that is the case of a DVA that performs the functions associated with a transparent (i.e., non-proxy) network service. In various embodiments, maintaining a non-disruptive flow of network data includes maintaining a consistent allocation of traffic to the data plane compute units associated with the DVA. For example, packets (e.g., Transmission Control Protocol "TCP" or User Datagram Protocol "UDP") associated with a particular flow of network traffic (e.g., as identified by a subset of the information included in a packet header) are always mapped (e.g., by a data planes dispatcher) to the same data plane compute unit. Furthermore, the consistent allocation of traffic is accomplished without the need for a data planes dispatcher compute unit to store information with respect to how network data associated with a certain network traffic flow maps to a certain data plane compute unit (e.g., all packets associated with network traffic flow A should be dispatched to data plane compute unit 3). Instead of requiring the data planes dispatcher compute units to store such mapping information (e.g., which network traffic flow should be mapped to which data plane compute unit), the data planes dispatcher uses a set of policies and/or distribution function (e.g., hashing or mapping techniques) to ensure that a flow of network traffic is always correctly allocated either to the data plane compute unit that already manages that flow or to a data plane compute unit that is available to manage a new flow.

In some embodiments, the data plane compute units do not store state information in persistent storage. An advantage in a data plane compute unit's lack of use of persistent storage is that no confidential data on the compute unit can remain after it has been powered off. Such a characteristic could improve security, such as in the transition of "ownership" of the data plane compute unit from one owner to another owner (when confidential data needs to be removed from the compute unit as a part of this transition).

In some embodiments, upon layout transitions (e.g., in the process of either adding or removing a data plane compute unit to/from a DVA), a flow of network traffic is passed from one data plane compute unit to another data plane compute unit. In this event, a data plane compute unit stores history information (such as a history table that includes information regarding predecessor data planes that manage a flow of network traffic that has been distributed to that data plane compute unit) (e.g., in memory). In some embodiments, a data plane compute unit determines which flows of network traffic belong to (e.g., are managed by) it or another data plane compute unit, and, if appropriate, punts network flows managed by another data plane compute unit back to that other data plane compute unit.

A data planes dispatcher compute unit is configured to communicate with entities outside of the DVA logical container. Examples of such outside entities include any entity that either sends network data to the DVA (e.g., a router) or any entity that receives network data that is sent from the DVA. As seen by outside entities, the data planes dispatcher is the termination point for network traffic that enters the DVA. In various embodiments, a DVA includes at least one data planes dispatcher compute unit. In various embodiments, a data planes dispatcher compute unit manages network traffic flows to and from the data plane compute units of the DVA. In the event that there are multiple data planes dispatcher compute units allocated to a particular DVA, each data planes dispatcher compute unit is configured to dispatch traffic to a subset of the data plane compute units associated with that DVA (the subsets of data plane compute units to which different data planes dispatcher compute units distribute network traffic can include at least some overlap).

In various embodiments, the one or more data planes dispatcher compute units associated with a particular DVA are configured to maintain a consistent allocation of network (e.g., packets) traffic/flows among the data plane compute units associated with that DVA. In various embodiments, the one or more data planes dispatcher compute units associated with a particular DVA are configured to consistently maintain network traffic flows for the DVA regardless of whether the DVA is initiating communication (e.g., if the DVA were implemented as part of a client device) or receiving an initiation of communication (e.g., if the DVA were implemented as part of a server device) or permitting network traffic to pass or cross through (e.g., if the DVA were implemented as a transparent network service).

In some embodiments, each data planes dispatcher compute unit is associated with at least one shared interface that is associated with the DVA. Network traffic that is sent to the DVA may be addressed to any one of the shared interface addresses associated with the DVA. The network traffic will then be received at the data planes dispatcher compute unit that is associated with that shared interface. In some embodiments, each shared interface address is associated with one data planes dispatcher compute unit and one or more data plane compute units. In some embodiments, the receiving data planes dispatcher compute unit is also configured to distribute the received packet to a data plane compute unit associated with the same shared interface to which the packet is addressed based on a set of policies and/or distribution function (e.g., a hashing technique). In some embodiments, the receiving data planes dispatcher compute unit is also configured to encapsulate the received packet using the tunneling protocol specially configured for the use of shared interface(s) prior to distributing the packet to the appropriate data plane compute unit. Further description regarding distribution of network traffic by the data planes dispatcher compute unit is below.

In some embodiments, the one or more data planes dispatcher compute units are configured to consistently maintain network traffic flows to the data plane compute units by using consistent hashing and permitting the data plane compute units to punt traffic flows among themselves. For example, a data planes dispatcher compute unit is configured to distribute traffic flows in the same way regardless of whether the flow is new (i.e., the flow is not already managed by any data plane compute unit of the DVA) or if the flow is an existing flow (i.e., the flow is not "new" and is already managed by one data plane compute unit). In other words, a data planes dispatcher compute unit does not need to track flow state, and will let the data plane compute units track flow states and punt traffic among themselves based on that state. When the DVA system is in a steady or stable state (i.e., each flow is managed by one data plane compute unit and has no predecessor data plane compute unit; this case occurs when there are no data plane compute units being added or removed from the DVA), the data planes dispatcher compute unit distributes the packet to the responsible data plane compute unit, which keeps the packet and processes it. When the DVA system is not in a steady or stable state (i.e., at least one flow which is hashed/mapped to one data plane compute unit was once hashed/mapped to another data plane compute unit of the DVA), the data planes dispatcher compute unit distributes the packet to the presently assigned data plane compute unit, which then refers to the history table to determine that another data plane compute unit has previously managed the flow and proceeds to punt the packet to the other data plane compute unit. For example, a data planes dispatcher compute unit is configured to consistently distribute packets associated with a certain existing (i.e., not "new") network traffic flow (e.g., flow A) to a certain data plane compute unit (e.g., data plane compute unit 3) by using one or more hashing/mapping techniques. Assume that in this example, prior to being distributed directly to data plane compute unit 3, flow A was previously managed by data plane compute unit 1 (e.g., because data plane compute unit 3 was added to the DVA subsequent to the addition of data plane compute unit 1). After the data planes dispatcher compute unit dispatches a packet associated with flow A to data plane compute unit 3, data plane compute unit 3 can refer to a history table to determine whether a predecessor data plane compute unit exists for flow A. Upon determining that flow A was previously managed by data plane compute unit 1, data plane compute unit 3 will punt the packet to data plane compute unit 1. More examples regarding consistent hashing and flow punting will be described below.

In some embodiments, the one or more data planes dispatcher compute units of a DVA are configured to communicate with each other such that one data planes dispatcher compute unit has an awareness of how another data planes dispatcher compute unit is assigning network traffic to the data plane compute units managed by this other data planes dispatcher compute unit. For example, when the DVA is configured to permit network traffic to cross through (e.g., when bidirectional traffic flows between a server and a client), the traffic will arrive at the DVA through two interfaces. Assume that in this example, there are two data planes dispatcher compute units, data planes dispatcher A and data planes dispatcher B. Assume in this example that data planes dispatcher A serves as the ingress for the traffic flows in one direction (e.g., from the client to the server) and data planes dispatcher B serves as the ingress for the traffic flows in the opposite direction (e.g., from the server to the client). In this case, data planes dispatcher A and data planes dispatcher B would need to coordinate with each other so that traffic flows in both directions are dispatched to the same data plane compute unit(s) for proper processing.

In various embodiments, an outside entity (e.g., a router) passes a packet destined for the DVA to one of the data planes dispatchers associated with the DVA. The data planes dispatcher that receives the packet uses a set of policies and/or distribution function (e.g., a hashing or some form of mapping technique) to allocate the packet to an appropriate data plane compute unit. Put another way, in various embodiments, the data planes dispatcher is a policy-based assignor of packets that enter the DVA. For example, the data planes dispatcher compute unit can perform at least one hash on information extracted from the header of a TCP or UDP packet to determine to which data plane compute unit the packet is to be allocated. In various embodiments, packets associated with a particular network traffic flow are always mapped to the same data plane compute unit (if not directly, then indirectly by virtue of the receiving data plane compute unit(s) punting the packet to the responsible data plane compute unit). Because the data planes dispatcher compute unit uses a set of policies and/or distribution function to consistently allocate packets associated with network traffic flows, the data plane compute units need only to minimally maintain state information associated with the network traffic flows that are processed by it (e.g., a data plane compute unit can keep track of the TCP packet sequence numbers associated with the flows that it manages). Synchronization of state information (e.g., among multiple data plane compute units) can be computationally expensive because, for example, for each TCP packet that is received by a data plane compute unit, the state information regarding the flow with which the packet is associated needs to be updated (e.g., to reflect the sequence number associated with the recently received packet). Since each act of receiving a packet by a data plane compute unit changes state information, the storage of state information needs to be multiplied by the number of data plane compute units associated with the DVA. In contrast to a system that requires the synchronization of state information, a DVA system that uses policy-based data planes dispatcher(s) requires only the storage of policies and/or a distribution function which the data planes dispatcher compute units use to assign/distribute network traffic, a comparatively lightweight solution.

In some embodiments, the allocation of network traffic by a data planes dispatcher compute unit to each data plane compute unit can change dynamically over time as a function of the processing capacity that is available on each data plane compute unit. Put another way, the amount of network traffic that a data planes dispatcher compute unit sends to a data plane compute unit can be variable over time. For example, a data planes dispatcher compute unit is not necessarily sending the same amount of traffic to each data plane compute unit, since different data plane compute units may have different amounts of processing power (e.g., based on the properties of the hardware from which each VM was provisioned). Instead, in some embodiments, a data planes dispatcher compute unit can send network traffic to the data plane compute units such that each data plane compute unit is similarly busy, relative to each data plane compute unit's respective processing capacity. For example, the data planes dispatcher compute unit can send network traffic to each data plane compute unit such that each data plane compute unit is operating at 30% of its CPU utilization.

In some embodiments, a data planes dispatcher compute unit can redistribute the amount of traffic passed to each data plane compute unit based on a periodic feedback (e.g., received from a monitoring data planes manager compute unit) of whether the current distribution of traffic needs to be changed. For example, if it is determined that one data plane compute unit is processing a comparatively high amount of network traffic that enters the DVA, then a data planes dispatcher can redistribute the traffic such that the data plane compute unit will receive fewer new flows in the future.

A data planes manager compute unit is configured to manage the other types of compute units (i.e., data planes, data planes dispatchers), and access persistent storage associated with a DVA logical container. In some embodiments, a DVA includes at least one data planes manager compute unit (e.g., more than one data planes manager could be needed in a DVA for redundancy or if there are too many data planes and data planes dispatchers to manage). In various embodiments, a data planes manager compute unit is configured to receive a set of DVA configuration information from a management tool at the DVA management interface in the form of (e.g., RESTful) APIs. For example, the DVA configuration information can be stored in a persistent storage (e.g., so that each time the DVA is turned on/instantiated, its associated configuration information can be recalled and retrieved from the persistent storage). The DVA configuration information can include, for example, one or more of: a network service that the DVA is to perform and configurations associated with the network service being implemented at the DVA (e.g., for a firewall network service, the configuration could include access control lists (ACLs) that define how packets are filtered, for a load balancer DVA, the configuration could include virtual IP information, back-end servers information and load balancing methods among those backend servers for the VIP), and one or more other properties of the DVA. In some embodiments, the DVA configuration information is stored on persistent storage associated with the DVA.

As described above, a DVA may be associated with one or more shared interfaces, where each shared interface is associated with its own interface address. At least a subset of the DVA's compute units (e.g., including one data planes dispatcher compute unit and one or more data plane compute units) is associated with each shared interface address. As such, a packet that is sent to the DVA is addressed to a shared interface address and is to be processed by the at least subset of the DVA's compute units associated with that particular shared interface address.

Figure 5:
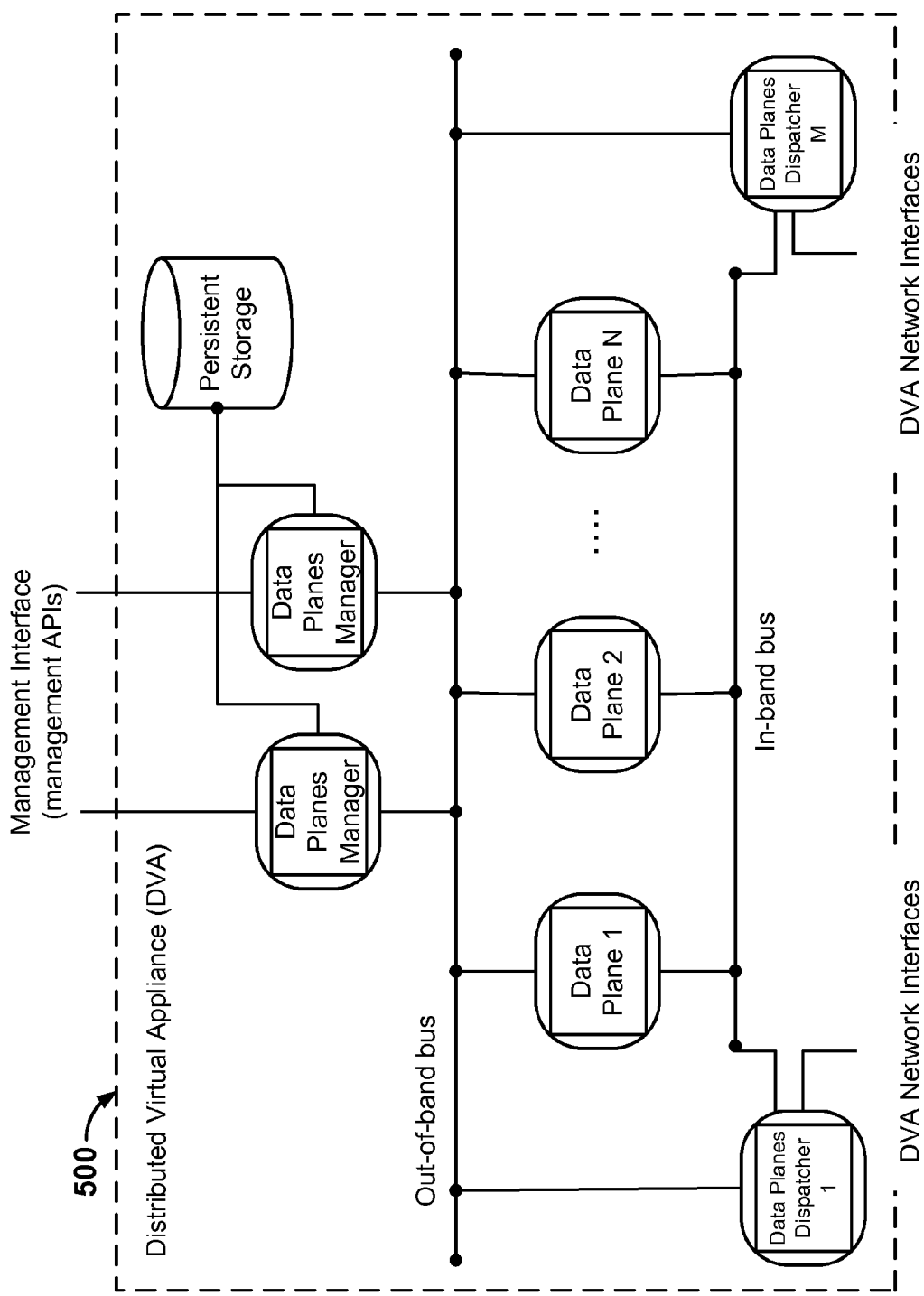
FIG. 5 is an example of the system of a distributed virtual appliance (DVA) in accordance with some embodiments.

FIG. 5 is an example of the system of a distributed virtual appliance (DVA) in accordance with some embodiments. In the example, DVA 500 includes data plane compute units 1 through N, data planes dispatcher compute units 1 through M, two data planes managers, and a persistent storage. In some embodiments, the layout of DVA 500 was determined by a set of policies that determined the N number of data plane compute units, M number of data planes dispatcher compute units, and the two data planes managers, among other layout related properties, that DVA 500 was to have. DVA 500 communicates with a management tool through the data planes manager compute units. In some embodiments, the data planes manager compute units use one or more application programming interfaces (APIs) to communicate back and forth with the management tool. DVA 500 can be configured (e.g., based on DVA configuration information received from the management APIs and stored at the persistent storage) to perform, for example, any one or more of the following network services: routing, switching, Fibre Channel over Ethernet (FCoE), traffic engineering, load balancing, firewall, secure sockets layer (SSL), hypertext transfer protocol (HTTP) acceleration, intrusion detection, and wide area network (WAN) optimization. In the example, the data planes manager compute units are linked to each other, data planes 1 through N, and data planes dispatchers 1 through M, via an out-of-band bus. In the example, data plane compute units 1 through N are linked to each other, and to data planes dispatchers 1 through M via an in-band bus. In various embodiments, the out-of-band bus and in-band bus are logical buses (as opposed to physical buses) that use (e.g., internal IP) protocols and messaging techniques that are specially designed to be used with the DVA system.

In various embodiments, a data planes dispatcher compute unit distributes a packet that it receives via one of the DVA network interfaces (e.g., from a router) to an appropriate data plane compute unit over the in-band bus. In various embodiments, the in-band bus is implemented as tunnels using a tunneling protocol specially designed to enable communication between data planes dispatcher compute units and data plane compute units. In various embodiments, the tunneling protocol is applied to packets that are received at a data planes dispatcher compute unit (e.g., by the receiving data planes dispatcher compute unit). In some embodiments, applying the tunneling protocol to the packets includes encapsulating the packets by adding at least one additional header to the packets. In some embodiments, the encapsulation permits the encapsulated packets to be passed between data planes dispatcher compute units and data plane compute units and among different data plane compute units (e.g., such as when packets are punted between data plane compute units) over the in-band tunnels. For example, data may be included in the encapsulation of a packet that indicates one or more of the following: which compute units of the DVA have previously received the packet, which compute unit(s) to which the packet should be distributed, how the packet is to be processed, which data structure is to be used to determine the distribution and/or punting that should be applied to the packet.

Figure 6:
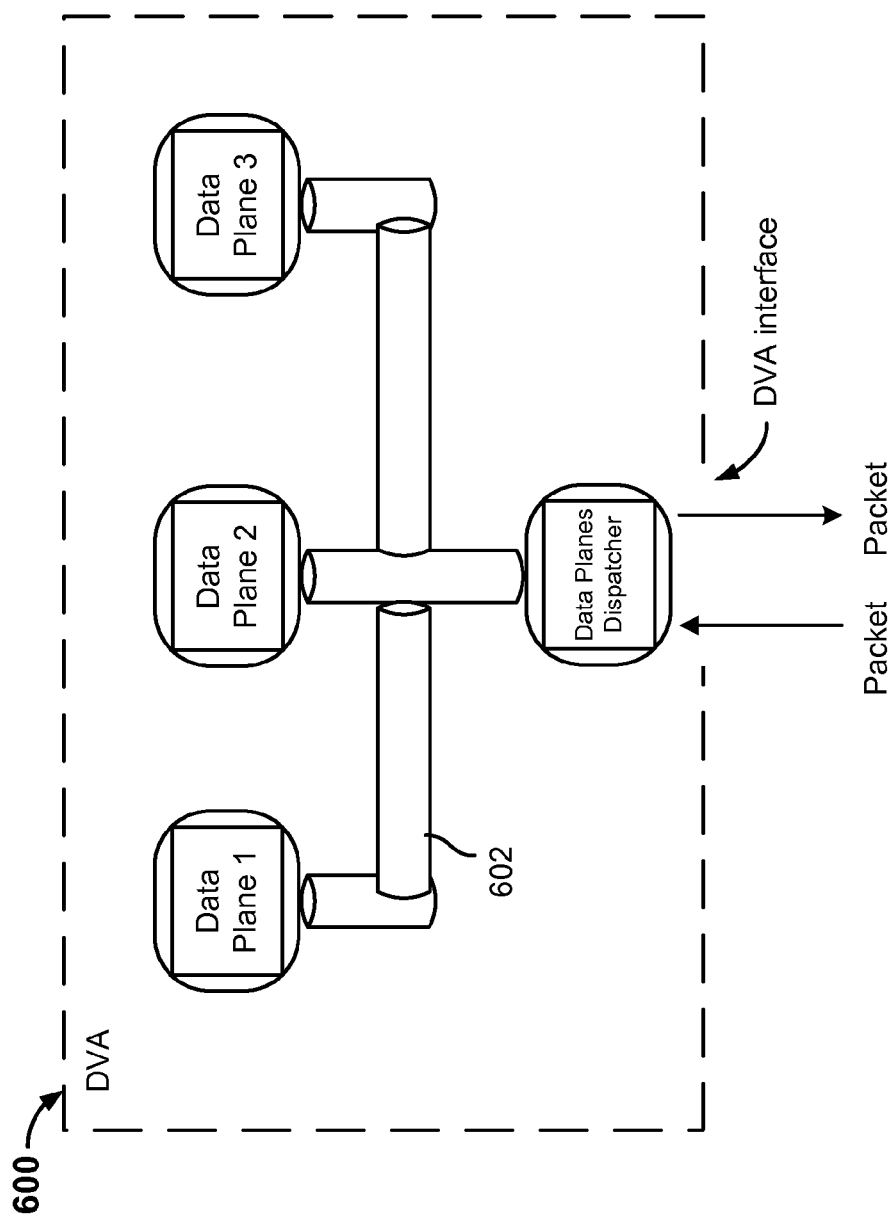
FIG. 6 is a diagram showing in-band tunnels between a data planes dispatcher compute unit and data plane compute units in accordance with some embodiments.

FIG. 6 is a diagram showing in-band tunnels between a data planes dispatcher compute unit and data plane compute units in accordance with some embodiments. In the example, the data planes dispatcher compute unit, data plane compute unit 1, data plane compute unit 2, and data plane compute unit 3 form a portion of DVA 600 (e.g., DVA 600 may have more data plane dispatcher compute units and/or more data plane compute units than what is shown in the example). In the example, the data planes dispatcher compute unit, data plane compute unit 1, data plane compute unit 2, and data plane compute unit 3 share an interface and are therefore all associated with the common interface address of the shared interface. Furthermore, the data planes dispatcher compute unit, data plane compute unit 1, data plane compute unit 2, and data plane compute unit 3 communicate to one another over in-band tunnel 602. An ingress packet addressed to the shared interface address of DVA 600 may be received at the data planes dispatcher compute unit.

In some embodiments, the data planes dispatcher compute unit is configured to determine which of data plane compute units 1, 2, or 3 to distribute the packet to. In some embodiments, the data planes dispatcher compute unit is configured to determine such a data plane compute unit using a set of policies that may include a hashing technique that consistently maps packets associated with the same flow of network traffic (ultimately) to the same data plane compute unit so that this same data plane compute unit will be responsible for processing all packets of that same network traffic flow. In some embodiments, the hashing technique uses at least a data structure (e.g., a hash table) that indicates which network traffic flows are mapped to which data plane compute units. In some embodiments, each time an existing data plane compute unit is removed from a DVA or a new data plane compute unit is added to the DVA, the data structure is updated or replaced with a new data structure to reflect the absence of a data plane compute unit or the addition of a new data plane compute unit to which packets may be mapped to. In some embodiments, the updated data structure or new data structure is also sent to each of the compute units of the DVA.

In some embodiments, prior to distributing the packet to the determined data plane compute unit, the data planes dispatcher compute unit applies a tunneling protocol associated with tunnel 602 to the packet. Applying the tunneling protocol includes prepending at least one additional header to the packet. Then, data may be included in the prepended header(s) of the encapsulation to indicate, for example, what has been done to the packet and what is to be done to the packet by the compute units associated with the shared interface.

In some embodiments, the encapsulated packet is then sent over tunnel 602 by the data plane dispatcher compute unit to the data plane compute unit determined using the most recently updated or created data structure associated with the hashing technique. In some embodiments, in the event that the data plane compute unit to which the packet is originally distributed determines that it is not responsible for processing the received packet (e.g., based on state information accessible by the data plane compute units such as a history table), the data plane compute unit punts the packet to another data plane compute unit. The packet may be punted again until a receiving data plane compute unit determines to keep and process the packet or until it is determined that the packet cannot be processed by any of the data plane compute units. Punting is further described below.

FIGS. 7 through 14B provide examples describing distributing packets to data plane compute units and also punting packets among data plane compute units.

Figure 7:
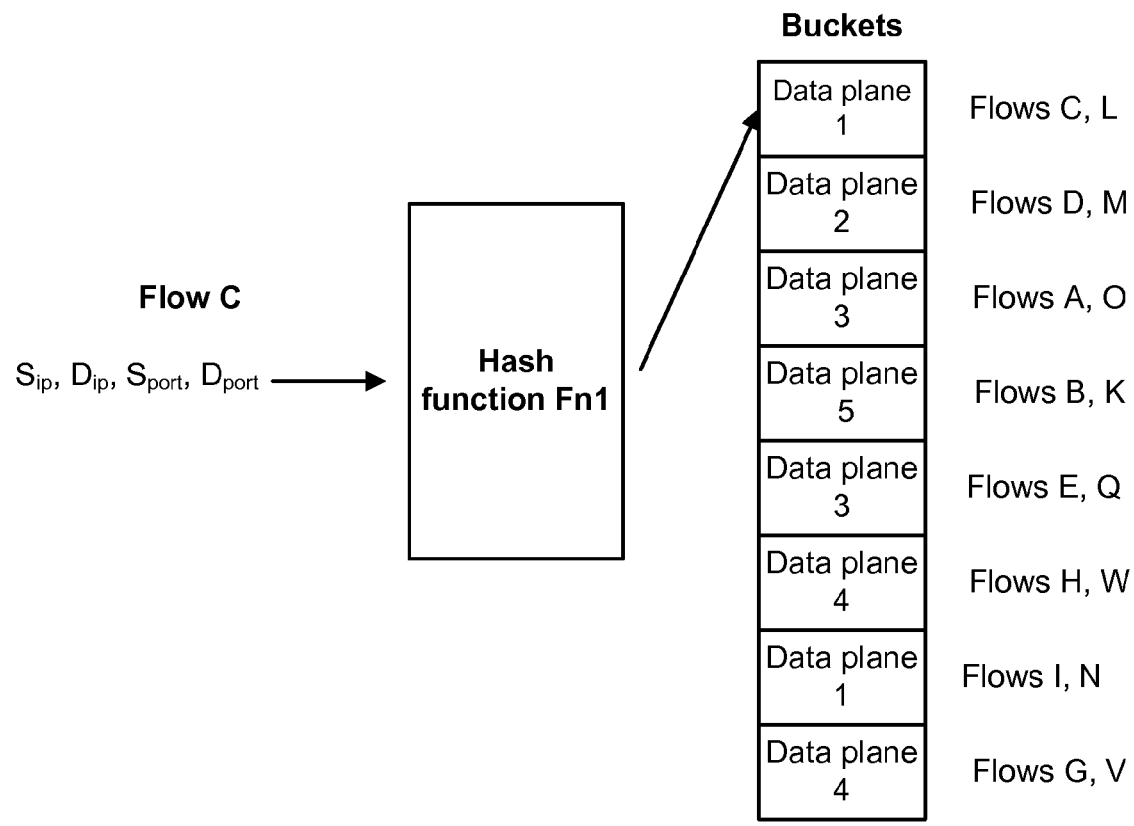
FIG. 7 is an example showing the hash table associated with distributing network traffic in accordance with some embodiments.

FIG. 7 is an example showing the hash table associated with distributing network traffic in accordance with some embodiments. In various embodiments, the hash function is performed by the data planes dispatcher compute unit in a system such as DVA 600. In some embodiments, a data planes dispatcher compute unit determines which data plane compute unit to distribute a received packet to based on a hash function. In some embodiments, the data planes dispatcher compute unit and all five data plane compute units (Data plane 1, Data plane 2, Data plane 3, Data plane 4, and Data plane 5) are associated with a shared interface. In some embodiments, the input into the hash function comprises information extracted from the original header of the packet. For example, if the packet were an Ethernet frame, then the input information would be extracted from the Ethernet header, UDP, or TCP header. In this example, a four-tuple ($S_{ip}$, $D_{ip}$, $S_{port}$, $D_{port}$) is extracted from the packet header to use as input into hash function Fn1. In various embodiments, the information extracted from the packet header uniquely represents a particular flow of network traffic. In various embodiments, the hash function maps an input value (e.g., either the source or destination information from the four-tuple ($S_{ip}$, $D_{ip}$, $S_{port}$, $D_{port}$)) to a particular parameter (e.g., bucket) of that hash function. In various embodiments, the hash function is designed so that extracted information associated with a particular network traffic flow always maps to the same bucket. In some embodiments, each bucket of the hash function is associated with a data plane compute unit to which the data planes dispatcher compute unit will distribute the packet. The association between a bucket of the hash function and the data plane compute unit is determined by a data planes dispatcher compute unit using the parameters of the hash function. In some embodiments, a data plane compute unit can be associated with more than one bucket. In some embodiments, the data plane compute unit associated with a bucket receives all the packets (e.g., belonging to one or more network traffic flows) that are mapped to that bucket by the data planes dispatcher compute unit. In some embodiments, approximately the same number of network traffic flows is assigned to each bucket (although each data plane compute unit may be assigned to one or more buckets, depending on each data plane compute unit's respective processing capacity).

In the example, Flow C of the input that was uniquely identified as the input in the form of ($S_{ip}$, $D_{ip}$, $S_{port}$, $D_{port}$) is mapped to the appropriate bucket by hash function Fn1. In the example, the data planes dispatcher compute unit has determined that Data plane 1 is most likely responsible for managing network traffic associated with Flow C and so allocates the packet to Data plane 1. The example also shows to which buckets and associated data plane compute units other flows (e.g., Flow D, Flow A, Flow B, Flow E, Flow H, Flow I, Flow G, Flow L, Flow M, Flow O, Flow K, Flow Q, Flow N, Flow V and Flow W) map. As shown in the example, a data plane compute unit can be assigned to/associated with a certain bucket and become responsible for the one or more network traffic flows that are hashed by hash function Fn1 to that bucket.

Figure 8:
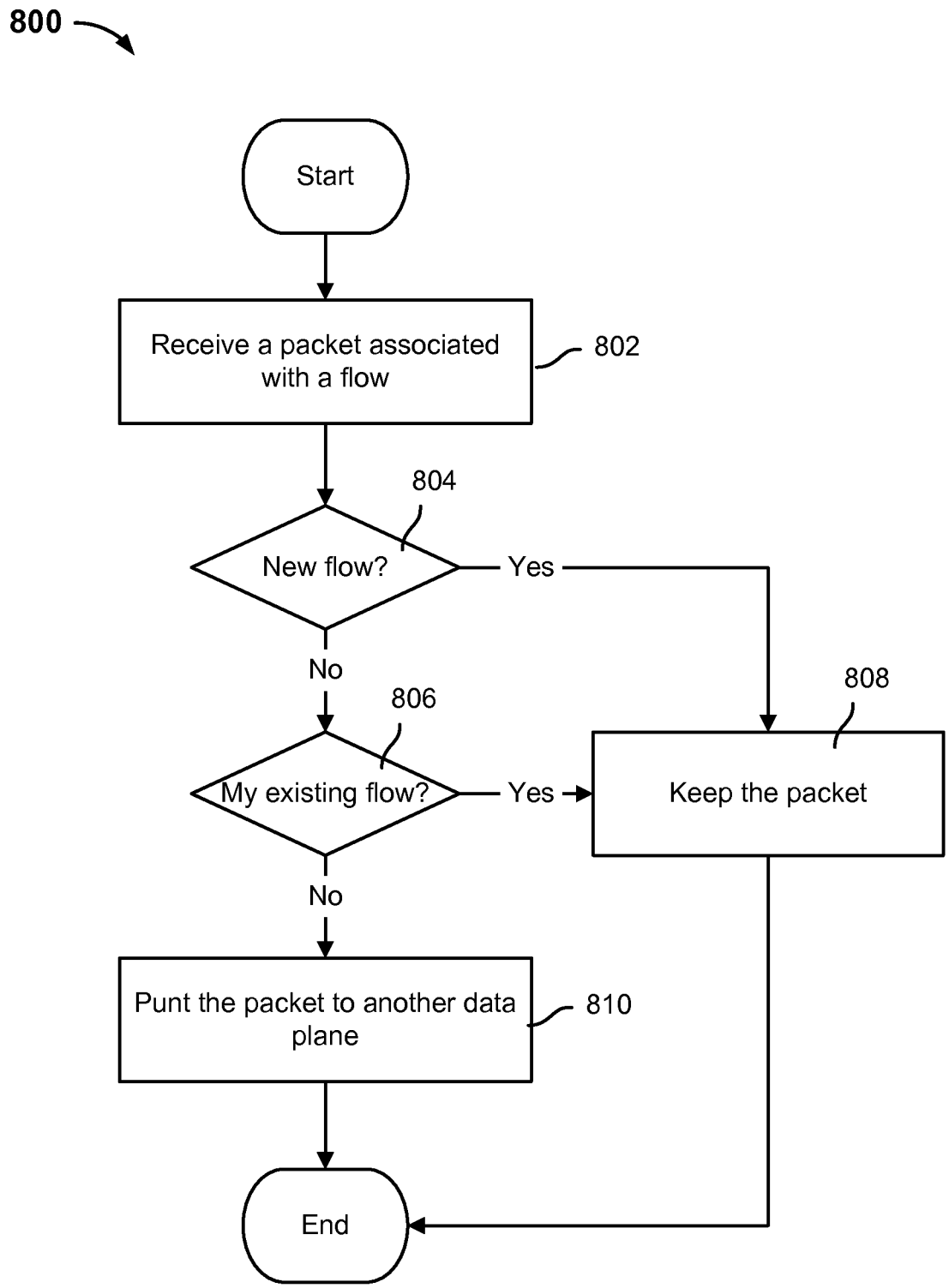
FIG. 8 is a flow diagram showing an example of a process at a data plane compute unit that receives a packet from a data planes dispatcher compute unit in accordance with some embodiments.

FIG. 8 is a flow diagram showing an example of a process at a data plane compute unit that receives a packet from a data planes dispatcher compute unit in accordance with some embodiments. In some embodiments, process 800 can be implemented at a data plane compute unit of DVA 600. In some embodiments, process 800 begins after a data planes dispatcher compute unit distributes a packet to the data plane compute unit after determining that the data plane compute unit is associated with the bucket identified by a hash function. At 802, the packet is received by the data plane compute unit. At 804, it is determined whether the packet is a new flow for which no data plane compute units of the DVA have previously received packets. For example, a new flow can be indicated by a SYN packet, which indicates the start of a connection. If it is determined that the packet is associated with a new flow, then control passes to 808, and the recipient data plane compute unit will keep and process the packet and be responsible for managing that flow (e.g., by processing subsequently received packets that are identified to be associated with that flow). Otherwise, if it is determined that the packet is not associated with a new flow but with an existing flow, meaning that a data plane compute unit at the DVA has already received and processed packets associated with that flow, then control passes to 806. At 806, it is determined whether the existing flow is managed by the recipient data plane compute unit. If it is determined that the recipient data plane compute unit is responsible for managing the flow, then control passes to 808 and the data plane compute unit keeps and processes the packet. For example, the recipient data plane compute unit can determine that it is responsible for managing the flow, for example, by determining that it has stored information (e.g., TCP state/packet sequence numbers) associated with that flow. So, if a data plane compute unit has stored TCP state information associated with a flow, it indicates that the data plane compute unit has managed the flow since the first received packet of that flow (e.g., the first received packet for a flow may be a SYN packet). Otherwise, if it is determined that the recipient data plane compute unit is not the data plane compute unit that is responsible for managing the flow, then control passes to 810 and the packet is punted or passed to another data plane compute unit. In some embodiments, the packet is passed to a predecessor data plane compute unit (e.g., as indicated in a history table), which is the data plane compute unit that the data planes dispatcher compute unit previously associated with the bucket. In some embodiments, the packet can be punted from one data plane compute unit to another in a daisy chain manner until a recipient data plane compute unit identifies the packet as being associated with a flow that it manages. However, if no data plane compute unit of the DVA identifies the packet, then the packet is discarded.

Figure 9:
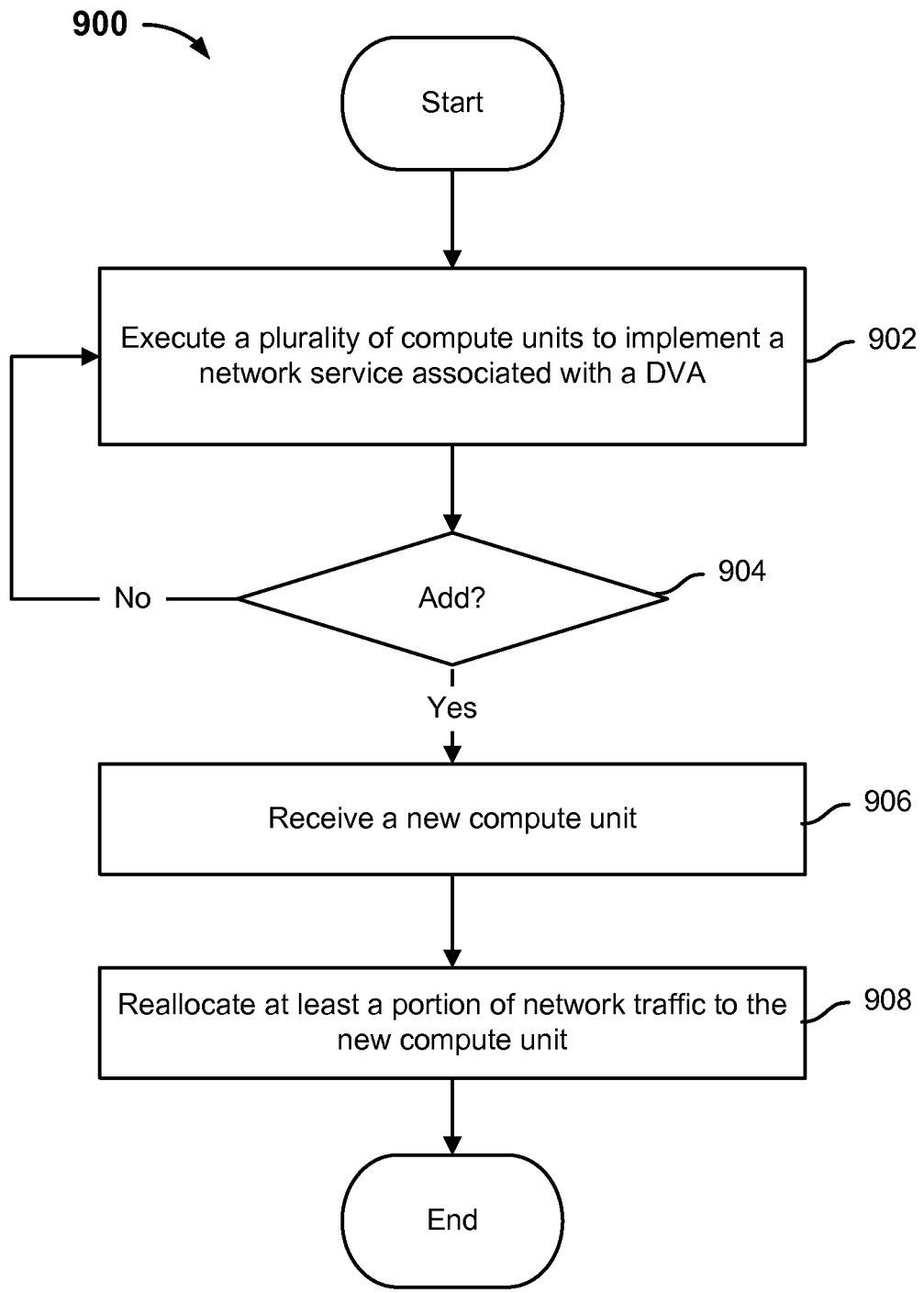
FIG. 9 is a flow diagram showing an example of a process of adding a compute unit to a DVA in accordance with some embodiments.

FIG. 9 is a flow diagram showing an example of a process of adding a compute unit to a DVA in accordance with some embodiments. In some embodiments, process 900 can be implemented on DVA 600. At 902, a plurality of compute units is executed to implement a network service associated with a DVA. For example, the plurality of compute units can include one or more data plane compute units, one or more data planes dispatcher compute units, and one or more data planes manager compute units that are allocated to perform a particular network service. At 904, it is determined if an additional compute unit needs to be added to the DVA. For example, at 904, the DVA could receive an indication that a new compute unit is to be added. For example, an additional compute unit can be added to the DVA in response to an event. Examples of the event can include a user selecting to add one or more compute units (e.g., data plane compute units) at a user interface associated with management of the DVA (e.g., in preparation for a potential future surge in processing needs) or the automatic detection that the DVA needs more processing capacity based on the monitored usage of the compute units of the DVA exceeding a certain threshold (e.g., that is specified in the set of policies for the layout of the DVA). If it is determined that a compute unit does not need to be added, then control passes back to 902. If it is determined that a compute unit does need to be added, then control passes to 906. For example, in response to receiving an indication to add a compute unit for a DVA, an available compute unit may be allocated to the DVA via a set of APIs. In some embodiments, the new compute unit can be configured to assume a role (e.g., one of a data plane, data planes dispatcher, or data planes manager) that is needed by the DVA. At 908, at least a portion of the network traffic is reallocated to the new compute unit at the DVA. For example, assume that the new compute unit is implemented as a data plane. Then network traffic can be reallocated by virtue of a data planes dispatcher compute unit assigning the new data plane compute unit to one or more buckets associated with the hash function, including by replacing the assignments of other data plane compute units to at least some of those buckets. As the network traffic is directed to the buckets assigned to the new data plane compute unit, the data plane compute unit will punt (e.g., pass) packets associated with existing flows that are managed by other data plane compute units but keep packets associated with new flows or existing flows that it manages itself. Over time, the new data plane compute unit will process a share of the DVA's network traffic without disrupting existing traffic to other data plane compute units.

Due to the updating of assignments of buckets to data plane compute units that occur as a result of adding a compute unit or removing a compute unit (as will be described further below), the hash table associated with the distribution of packets is updated or a new hash table is created to represent the updated assignments between the buckets and the data plane compute units of the DVA. In some embodiments, the updated or newly created hash table is distributed to all the compute units of the DVA. However, distributing the updated or newly created hash table will take time. As a result, there can be a period of time in which not all the compute units have the most up-to-date tables. In some embodiments, a value of a field (the "ERA" field) included in a header of the packet encapsulation is used so that a data plane compute unit that receives a packet can determine whether it has the most updated hash table. For example, the era value associated with an updated hash table may alternate between 0 and 1, where the value indicates the current era associated with the most up-to-date hash table. The ERA field included in the header of the packet encapsulation may include the era value associated with the most up-to-date hash table. The compute units also may each store the most recent hash table and associated era value that it has received. A compute unit that receives an encapsulated packet may determine whether it has received the most up-to-date hash table by comparing the era value (0 or 1) of the most recently received hash table to the value of the ERA field of the received encapsulated packet. If the values do not match, then it indicates that the compute unit has not yet received the most up-to-date hash table and may wait to do so before it determines whether to and/or how to distribute the received encapsulated packet. If the values do match, then it indicates that the compute unit has already received the most up-to-date hash table and can determine whether to and/or how to distribute the received encapsulated packet.

Figures 10A, 10B:
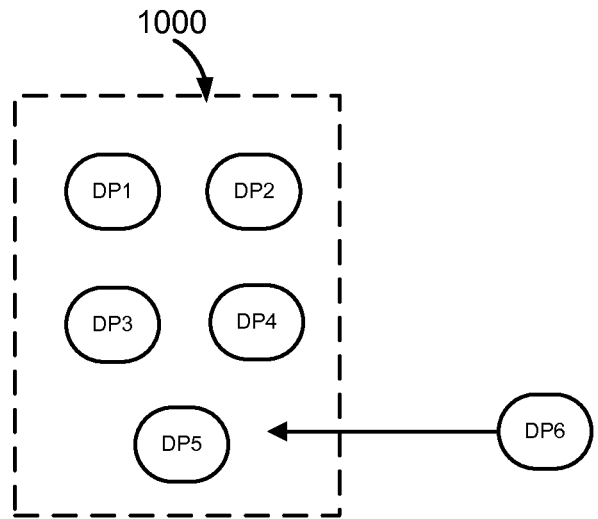
FIGS. 10A and 10B illustrate an example of adding a data plane compute unit to a DVA in accordance with some embodiments.

FIGS. 10A and 10B illustrate an example of adding a data plane compute unit to a DVA in accordance with some embodiments. In the example, DVA 1000 originally included five data plane compute units (Data plane 1 "DP1," Data plane 2 "DP2," Data plane 3 "DP3," Data plane 4 "DP4," and Data plane 5 "DP5"). Assume that when using a process, such as process 900, it is determined that another data plane compute unit is to be added to DVA 1000 to increase the processing capacity for the network service associated with DVA 1000. A new data plane compute unit, DP6, is then allocated and added to DVA 1000.

In the example, buckets 1002 of FIG. 10B represent the updated buckets of the hash table associated with a hash function (e.g., hash function Fn1 of FIG. 7). Each bucket of buckets 1002 is associated with one data plane compute unit and one or more traffic flows that always map to that bucket (e.g., by hash function Fn1). Prior to the addition of DP6, each bucket of buckets 1002 was assigned to one of the five original data plane compute units (DP1, DP2, DP3, DP4, or DP5). However, since the addition of DP6 to the DVA, some buckets (and also their associated flows) are reassigned from their original data plane compute units to DP6. In the example, it is shown that the bucket associated with Flows C and L are reassigned from Data plane 1 (DP1) to new Data plane 6 (DP6) and that the bucket associated with Flows A and O are reassigned from Data plane 3 (DP3) to new Data plane 6 (DP6). So, after the addition of DP6 and the reassignment, packets associated with Flows C and L will now be first distributed to DP6 instead of DP1. Also, packets associated with Flows A and O will now be first distributed to DP6 instead of DP3. In some embodiments, the reassignment of buckets to data plane compute units is reflected in a history table that is stored in a memory associated with the DVA. In some embodiments, such changes to the hash table associated with the distribution of packets prompts the "ERA" field included in each header of the encapsulation of a packet to be updated. For example, assuming that the data plane compute units of the DVA cannot be out of sync for more than one state, the "ERA" value may be binary such that each update to the hash table due to the addition of a new compute unit or the removal of an existing compute unit causes the "ERA" value to change from "0" to "1" (if the "ERA" was previously "0") and from "1" to "0" (if the ERA was previously "1"). So, for example, a data plane compute unit that receives an encapsulated packet may compare its stored "ERA" value with the current "ERA" value included in the encapsulation of the packet. If the values are different, then the data plane compute unit knows that it has not yet received the most up-to-date hash table. Or if the values are the same, then the data plane compute unit knows that it has already received the most up-to-date hash table and may use the hash table to determine punting information.

FIGS. 11A, 11B, and 11C illustrate examples of updating a history table in association with the addition of a new data plane compute unit to a DVA and the reallocation of network traffic in the DVA in accordance with some embodiments.

FIG. 11A shows an example of a history table associated with a DVA in accordance with some embodiments. In some embodiments, a history table (e.g., stored in memory) is associated with a DVA and can be accessed by all the compute units associated with the DVA. In the example, the history table includes a set of buckets (e.g., Buckets a through r) associated with a hash function. The first column of the history table includes the data plane compute unit that is currently assigned to a corresponding bucket and directly receives from the data planes dispatcher compute unit the one or more flows that map to that bucket. The second and third columns include, if appropriate, the data plane compute units that were previously assigned to the corresponding bucket (i.e., "predecessors") and had received the one or more flows that mapped to that bucket before they were replaced by another data plane compute unit (e.g., a newly added data plane compute unit). While the example history table includes columns for only the first and second predecessors, a history table can include any number of predecessors. For example, continuing the example from FIGS. 10A and 10B, a packet associated with Flow A is mapped to Bucket c, which is currently associated with Data plane 6

(which was recently added to the DVA). However, Bucket c was previously associated with Data plane 3 and so packets associated with Flow A were previously first distributed to the first predecessor Data plane 3. In the example, Bucket c does not have a second predecessor (i.e., a data plane compute unit that was assigned to receive packets mapped to Bucket c before Data plane 3). Because the first and only predecessor of Bucket c in this example is Data plane 3, it is implied that (e.g., using a process such as process 800 at Data plane 3) Data plane 3 was the first data plane compute unit to receive Flow A when it was a new flow and so Data plane 3 is responsible for managing Flow A until Flow A terminates. Once Data plane 6 receives a packet that is associated with Flow A (i.e., an existing flow) from the data planes dispatcher compute unit, it will punt the packet to Data plane 3, which is responsible for managing that flow. By virtue of needing to punt the packet from one data plane to another (e.g., Data plane 6 to Data plane 3), there is a daisy chain of one hop associated with Flow A. The use of a daisy chain to redirect traffic associated with existing flows to the responsible data plane compute unit ensures that traffic to the DVA can be reallocated without disrupting or dropping traffic to the DVA. In some embodiments, the DVA will reach a steady or stable state, meaning that all daisy chains will be zero. Put another way, when the DVA reaches a steady or stable state, a data plane compute unit will no longer need to punt a packet that it receives to any other data plane compute unit (e.g., due to the fact that flows associated with a predecessor data plane compute unit will terminate over time).

FIG. 11B shows an example of a data plane compute unit punting a packet to another predecessor data plane compute unit in accordance with some embodiments. In the example, a packet associated with existing Flow A (e.g., that is mapped to Bucket c) is distributed by a data planes dispatcher to Data plane 6 (e.g., the data plane that is currently assigned to Bucket c). Upon receiving the packet, Data plane 6 can perform a process such as process 800 to determine that the packet is part of an existing flow that it does not manage. Data plane 6 can look up the history table (e.g., the example of FIG. 11A) to see that the first and only predecessor data plane compute unit for Bucket c is Data plane 3. Then, Data plane 6 can punt the packet to Data plane 3. Upon receiving the packet, Data plane 3 can also perform a process such as process 800 to determine that the packet is an existing flow and is also managed by Data plane 3. Data plane 3 will then keep the packet and process it. Data plane 6 will continue to punt packets it receives that are associated with Flow A until Flow A terminates. While in this example, Data plane 3 is the data plane compute unit that manages the packet that it receives, in another scenario where Data plane 3 receives a packet that it does not manage, it can look up the history table for another predecessor data plane compute unit to punt the packet to or discard the packet if no predecessor is found.

FIG. 11C shows an example of a data plane compute unit receiving a packet from a new flow in accordance with some embodiments. In the example, Data plane 6 receives a packet associated with new Flow R (e.g., new Flow R was mapped to Bucket c, which is currently associated with Data plane 6). Upon receiving the packet, Data plane 6 can perform a process such as process 800 and determine that the packet (e.g., a SYN packet) is associated with a new flow and so it should keep the packet.

Figure 12:
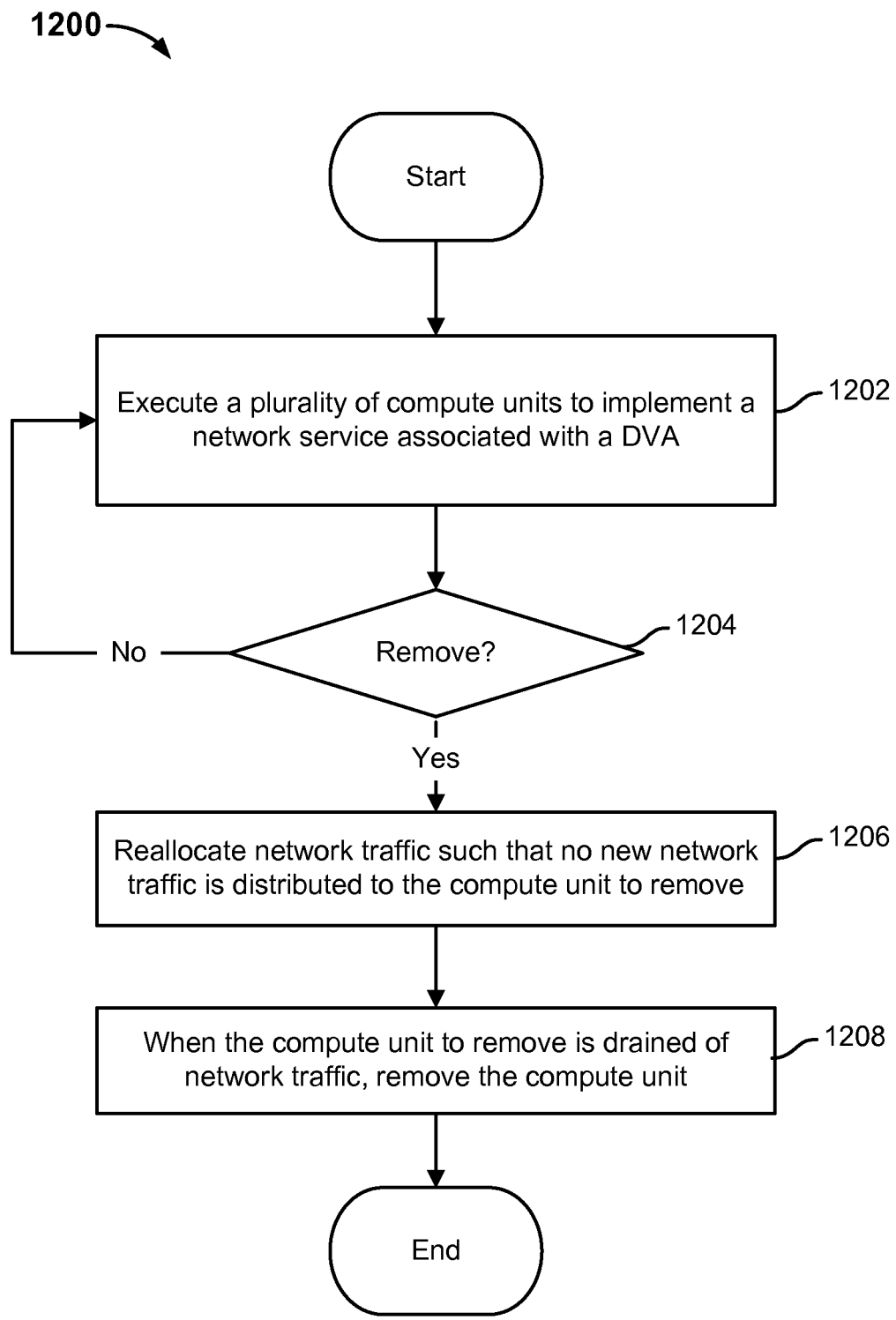
FIG. 12 is a flow diagram showing an example of a process of removing a compute unit from a DVA in accordance with some embodiments.

FIG. 12 is a flow diagram showing an example of a process of removing a compute unit from a DVA in accordance with some embodiments. In some embodiments, process 1200 can be implemented on DVA 600. At 1202, a plurality of compute units is executed to implement a network service associated with a DVA. At 1204, it is determined if a compute unit needs to be removed from the DVA. For example, at 1204, the DVA could receive an indication that a compute unit is to be removed. For example, a compute unit can be removed from the DVA in response to an event. Examples of the event can include a user selecting to remove one or more compute units (e.g., data plane compute units) at a user interface associated with management of the DVA (e.g., after a slowdown in processing needs has been detected) or the automatic detection that the DVA needs less processing capacity based on the monitored usage of the compute units of the DVA falling below a certain threshold (e.g., that is specified in the set of policies for the layout of the DVA). If it is determined that a compute unit does not need to be removed, then control passes back to 1202. If it is determined that a compute unit does need to be removed, then control passes to 1206. For example, in response to receiving an indication to remove a compute unit for a DVA, a communication may be made to a data planes manager compute unit of the DVA to stop allocating new flows to the compute unit to remove. In some embodiments, the data planes manager compute unit then turns around and notifies a data planes dispatcher to stop allocating new flows to the compute unit that is to be removed. At 1206, network traffic is reallocated such that no new network traffic is distributed to the compute unit to remove. For example, assume that the compute unit to remove is a data plane compute unit. The data planes dispatcher compute unit can stop allocating new flows to the data plane compute unit that is to be removed by reassigning other data plane compute units to the buckets of the second hash function associated with the compute unit to be removed. This way, any new flows will always be first distributed to a data plane compute unit other than the data plane compute unit that is to be removed and so it never receives or manages any more new flows. Eventually, the existing flows associated with the data plane compute unit to be removed will terminate. Once all the existing flows associated with the data plane compute unit to be removed terminate, then control passes to 1208. At 1208, when the compute unit to be removed is drained of network traffic, the compute unit is removed. For example, the compute unit could be removed from the DVA (e.g., via APIs) and the resources of the compute unit are returned back to the hardware from which it was provisioned so that they may be used for the same or other DVAs (e.g., when the need arises). By preventing new flows from reaching the data plane compute unit to be removed and waiting for the existing network traffic processed by the data plane compute unit to end, a compute unit can be removed from a DVA without disruption to the network traffic for the DVA.

Figure 13A:
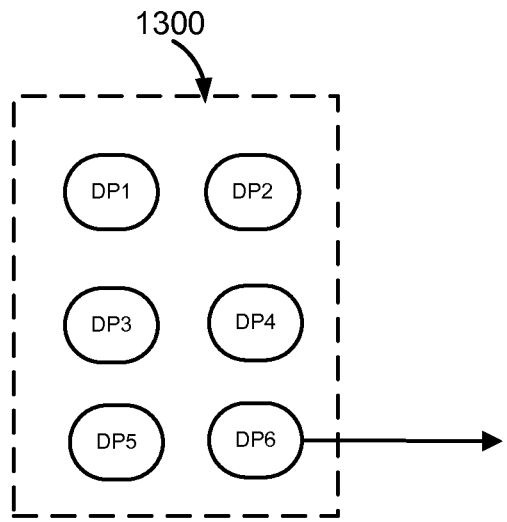
FIGS. 13A and 13B illustrate examples of removing a data plane compute unit from a DVA in accordance with some embodiments.
Figure 13B:
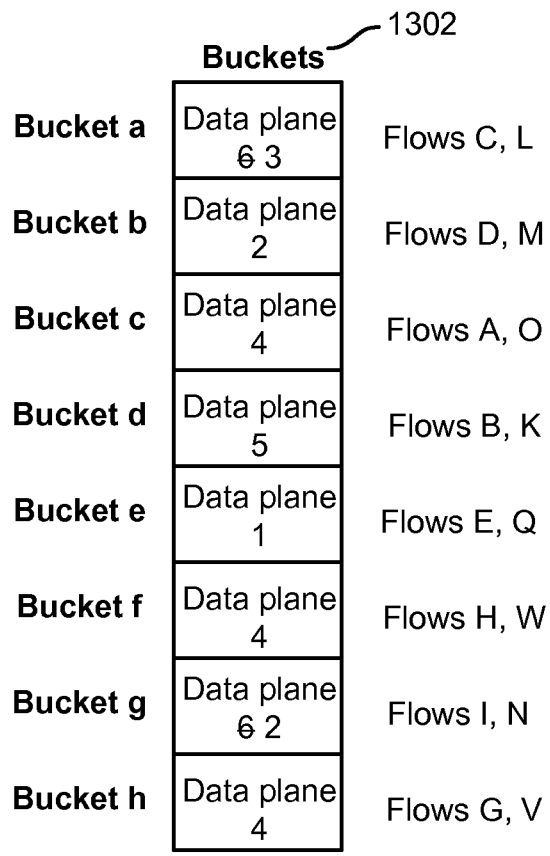

FIGS. 13A and 13B illustrate examples of removing a data plane compute unit from a DVA in accordance with some embodiments. In the example, DVA 1300 includes six data plane compute units (Data plane 1 "DP1," Data plane 2 "DP2," Data plane 3 "DP3," Data plane 4 "DP4," Data plane 5 "DP5," and Data plane 6 "DP6"). Assume that in using a process such as process 1200, it is determined that a data plane compute unit, DP6, is to be removed from DVA 1300 to decrease the processing capacity for the network service associated with DVA 1300. So, it is communicated to DVA 1300 to stop allocating new flows to DP6. Then, when all the network traffic is drained from DP6 (i.e., when all of its existing flows terminate), DP6 is removed.

In the example, buckets 1302 represent the buckets associated with a hash function (e.g., hash function Fn1 of FIG.

7). Each bucket of buckets 1302 is associated with one data plane compute unit and one or more traffic flows that always map to that bucket. Prior to the determination to remove DP6, each bucket of buckets 1302 was assigned to one of the six data plane compute units (DP1, DP2, DP3, DP4, DP5, and DP6). However, since the determination to remove DP6 from the DVA, some buckets (and also their associated flows) that were assigned to DP6 are reassigned to other data plane compute units. In the example, it is shown that the bucket associated with Flows C and L are reassigned from Data plane 6 (DP6) to Data plane 3 (DP3) and that the bucket associated with Flows I and N are reassigned from Data plane 6 (DP6) to Data plane 2 (DP2). So, after the determination to remove DP6 and the reassignment, packets associated with Flows C and L will now be first distributed to DP3 instead of DP6. Also, packets associated with Flows I and N will now be first distributed to DP2 instead of DP6. In some embodiments, the reassignment of buckets to data plane compute units is reflected in an updated history table that is stored in memory associated with the DVA. The effect of the reassignment is such that the compute unit to be removed (DP6) will not be the first data plane compute unit to receive any new flows and will therefore be drained of network traffic once its existing flows terminate. As mentioned above, in some embodiments, such changes to the hash table associated with the distribution of packets prompts the "ERA" field included in each header of the encapsulation of a packet to be updated and for a copy of the most up-to-date hash table to be sent to each compute unit of the DVA.

Figures 14A, 14B:
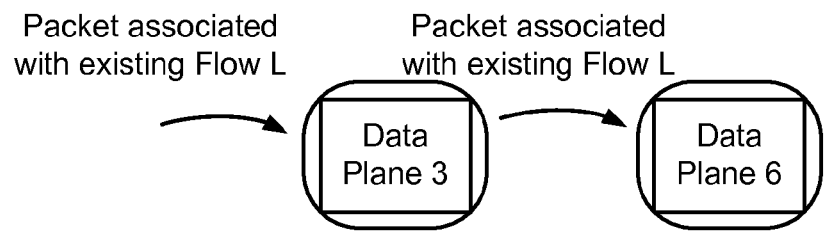
FIGS. 14A and 14B illustrate examples of updating a history table in association with the removal of a data plane compute unit from a DVA and the reallocation of network traffic in the DVA in accordance with some embodiments.

FIGS. 14A and 14B illustrate examples of updating a history table in association with the removal of a data plane compute unit from a DVA and the reallocation of network traffic in the DVA in accordance with some embodiments.

FIG. 14A shows an example of a history table associated with a DVA in accordance with some embodiments. In some embodiments, a history table (e.g., stored in memory) is associated with a DVA and can be accessed by all the compute units associated with the DVA. In the example, the history table includes a set of buckets (e.g., Buckets a through e) associated with a hash function. The first column of the history table includes the data plane compute unit that is currently assigned to a corresponding bucket and directly receives from the data planes dispatcher compute unit the one or more flows that map to that bucket. The second and third columns include, if appropriate, the data plane compute units that were previously assigned to the corresponding bucket (i.e., "predecessors") and have received the one or more flows that mapped to that bucket before they were replaced by another data plane compute unit (e.g., a newly added data plane compute unit). While the example history table includes columns for only the first and second predecessors, a history table can include any number of predecessors. For example, a packet associated with Flow L is mapped to Bucket a, which is currently associated with Data plane 3 (replacing Data plane 6, which is to be removed once its existing flows terminate). However, Bucket a was previously associated with predecessor Data plane 6. In the example, Bucket a does not have a second predecessor (i.e., a second predecessor would be a data plane compute unit that was assigned to Bucket a before Data plane 6). Because the first and only predecessor of Bucket a in this example is Data plane 6, it is implied that (e.g., using a process such as process 800 at Data plane 6) Data plane 6 was the first data plane compute unit to receive Flow L when it was a new flow and so Data plane 6 is responsible for managing Flow L until Flow L terminates. Once Data plane 3 receives a packet that is associated with Flow L (i.e., an existing flow) from the data planes dispatcher compute unit, it will punt the packet to Data plane 6, which is responsible for managing that flow. By virtue of needing to punt the packet from one data plane (e.g., Data plane 3 to Data plane 6), there is a daisy chain of one hop associated with Flow L. The use of a daisy chain to redirect traffic associated with existing flows to the responsible data plane compute unit ensures that traffic to the DVA can be reallocated without disrupting or dropping traffic at the DVA.

FIG. 14B shows an example of a data plane compute unit punting a packet to another predecessor data plane compute unit in accordance with some embodiments. In the example, a packet associated with existing Flow L (e.g., that is mapped to Bucket a) is distributed by a data planes dispatcher to Data plane 3 (e.g., the data plane that is currently assigned to Bucket a), which replaced Data plane 6 (e.g., that data plane that was previously assigned to Bucket a). Upon receiving the packet, Data plane 3 can perform a process such as process 800 to determine that the packet is part of an existing flow that it does not manage. Data plane 3 can look up the history table (e.g., the example of FIG. 14A) to see that the first and only predecessor data plane compute unit for Bucket a1. is Data plane 6. Then Data plane 3 can punt the packet to Data plane 6 to process it. Upon receiving the packet, Data plane 6 can also perform a process such as process 800 to determine that the packet is an existing flow and is also managed by Data plane 6. So, Data plane 6 will keep the packet and process it. Data plane 3 will continue to punt packets it receives that are associated with Flow L until Flow L terminates. When Flow L and all other existing flows managed by Data plane 6 terminate, Data plane 6 may be removed.

Figure 15:
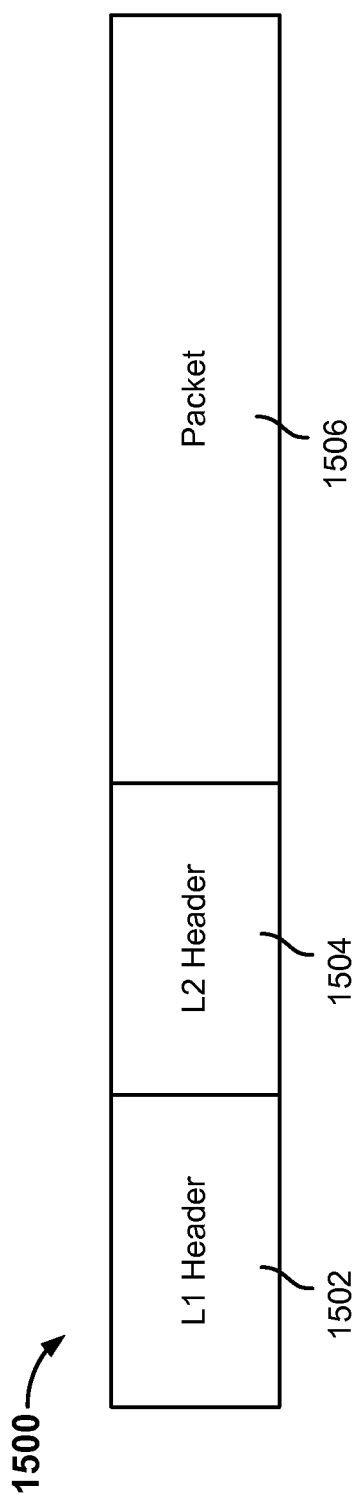
FIG. 15 is a diagram showing an example of an encapsulated packet in accordance with some embodiments.

FIG. 15 is a diagram showing an example of an encapsulated packet in accordance with some embodiments. Encapsulated packet 1500 is an example of the encapsulation that is performed (e.g., by a data planes dispatcher compute unit) on a packet that is received at a DVA so that the encapsulated packet may be passed between compute units of the DVA. In the example, encapsulated packet 1500 includes the original packet, packet 1506, prepended by two headers, L1 header 1502 and L2 header 1504. For example, packet 1506 may comprise an Ethernet frame. In some embodiments, L1 header 1502 enables communication between a data planes dispatcher compute unit and data plane compute units and L2 header 1504 enables communication between different data plane compute units. In some embodiments, L1 header 1502 includes at least an IP header and a user datagram protocol (UDP) header.

In some embodiments, L1 header 1502 further includes a source port number (e.g., within the UDP header) that is used to determine the underlying path through the network over which the encapsulated packet is to be distributed by the data planes dispatcher compute unit. Generally, packets traveling between a given pair of compute units on the network have fixed values for most of the fields (e.g., source and destination address MAC addresses, source and destination IP addresses, upper layer protocol, destination port) within certain headers (e.g., layer 2, 3, and 4 headers). However, if the source port numbers for L1 headers for packets were determined based on the hash of the fixed values common to packets traveling between a given pair of compute units, then the packets would be transported over similar underlying network paths, thus creating a performance bottleneck. Therefore, to avoid such a bottleneck and to introduce variability in determining the source port number for the L1 headers for packets, in some embodiments, this source port number of L1 header 1502 is computed as a hash of a selection of one or more fields of the payload portion of packet 1506 because it is assumed that there is more variability in the content of the payloads between different packets traveling between a given pair of compute units. By introducing variability in the determined source port numbers for the L1 headers of packets, the encapsulated packets may be transported over different paths through the network, thereby mitigating the possibility of bottlenecking.

In some embodiments, L1 header 1502 also includes data that enables communication between the data planes dispatcher compute unit and data plane compute unit(s) such as, for example, data that indicates to which data plane compute unit the encapsulated packet is to be sent (where this specified data plane compute unit is associated with a shared interface indicated by a data value in L2 header 1504) and data that indicates which data planes dispatcher compute unit received, encapsulated, and distributed the packet.

In some embodiments, L2 header 1504 includes various fields that indicate which shared interface the packet is associated with (where the data plane compute unit(s) determined for sending the encapsulated packet to are associated with this shared interface), which compute units of the DVA have previously received the packet, if/how the previous compute units have processed the packet, which data plane compute unit(s) to which the packet should be distributed, how the packet is to be processed, and which data structure (e.g., hash table) is to be used to determine the distribution and/or punting that should be applied to the packet.

Figure 16:
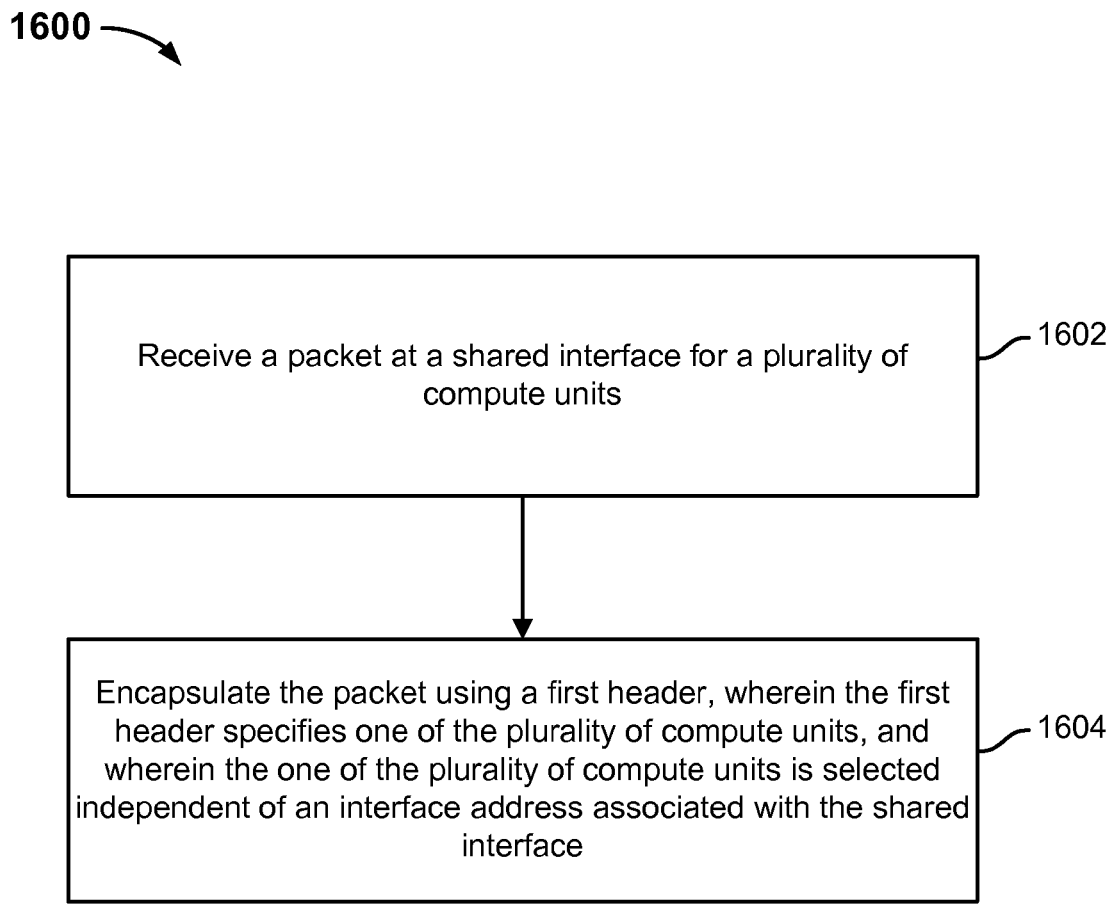
FIG. 16 is a flow diagram showing an example of a process for receiving a packet at a DVA in accordance with some embodiments.

FIG. 16 is a flow diagram showing an example of a process for receiving a packet at a DVA in accordance with some embodiments. In some embodiments, process 1600 may be implemented at DVA 600.

At 1602, a packet is received at a shared interface for a plurality of compute units. In some embodiments, the plurality of compute units forms at least a portion of a DVA. In some embodiments, the compute units are each associated with the address associated with the shared interface. In some embodiments, each compute unit is assigned a role (e.g., a data planes dispatcher, a data plane, or a data planes manager). In some embodiments, the packet is addressed to an address of the shared interface and received by a data planes dispatcher compute unit associated with that shared interface. The packet may include an Ethernet frame, for example.

At 1604, the packet is encapsulated using a first header, wherein the first header specifies one of the plurality of compute units, and wherein the one of the plurality of compute units is selected independent of an interface address associated with the shared interface. The receiving data planes dispatcher compute unit or another mechanism may encapsulate the received packet by prepending at least a first header associated with a tunneling protocol specially configured for shared interfaces. Applying tunneling (the encapsulation) to the packet enables the virtualization of the shared interface so that the received packet may be received by one or more compute units as if the interface were attached to the compute units. In various embodiments, the receiving data planes dispatcher compute unit does not alter the shared interface address included in the encapsulation of the packet but rather distributes the encapsulated packet to a data plane compute unit that is also associated with the shared interface. In some embodiments, the first header includes data that enables communication between data planes dispatcher compute units and data plane compute units. In some embodiments, the receiving data planes dispatcher compute unit may determine a data plane compute unit to distribute the packet to. As described above, compute units with the data planes dispatcher roles do not process a received packet but distribute it to at least one data plane compute unit for the data plane compute unit(s) to process the packet (e.g., based on the network service(s) associated with the DVA). In some embodiments, the receiving data planes dispatcher compute unit may determine a data plane compute unit (associated with the same shared interface address) to which to send the packet based at least in part on inputting at least a portion of data extracted from the packet's original header (e.g., an Ethernet frame header, a UDP header, or a TCP header) into a hash function that facilitates consistent mapping of packets of the same network traffic flow to be received at the same data plane compute units. For example, a data structure (e.g., a hash table) associated with the hash function may be updated or replaced with a new data structure in response to an addition of a data plane compute unit or a removal of a data plane compute unit from the DVA. In some embodiments, identifying data associated with the data plane compute unit to which the packet is determined to be sent is included in the first header of the packet's encapsulation. In some embodiments, the data plane compute unit to which the encapsulated packet is sent by the data planes dispatcher compute unit may either keep and process the packet or punt the packet to another data plane compute unit based on a process such as process 800. In some other embodiments, the data planes dispatcher compute unit is configured to distribute the encapsulated packet to multiple data plane compute units (as opposed to just one). An example of the first header will be further described with FIG. 17.

In some embodiments, encapsulating the packet in process 1600 includes prepending at least a second header associated with the tunneling protocol. In some embodiments, the second header includes data associated with which shared interface the packet is associated with (e.g., because the DVA may be associated with multiple shared interfaces), which compute units of the DVA that have previously received the packet, if/how the previous compute units have processed the packet, which data plane compute unit(s) to which the packet should be distributed, how the packet is to be processed, and which data structure (e.g., hash table) is to be used to determine the distribution and/or punting that should be applied to the packet. Examples of the second header will be further described in FIGS. 18A, B, and C.

Figure 17:
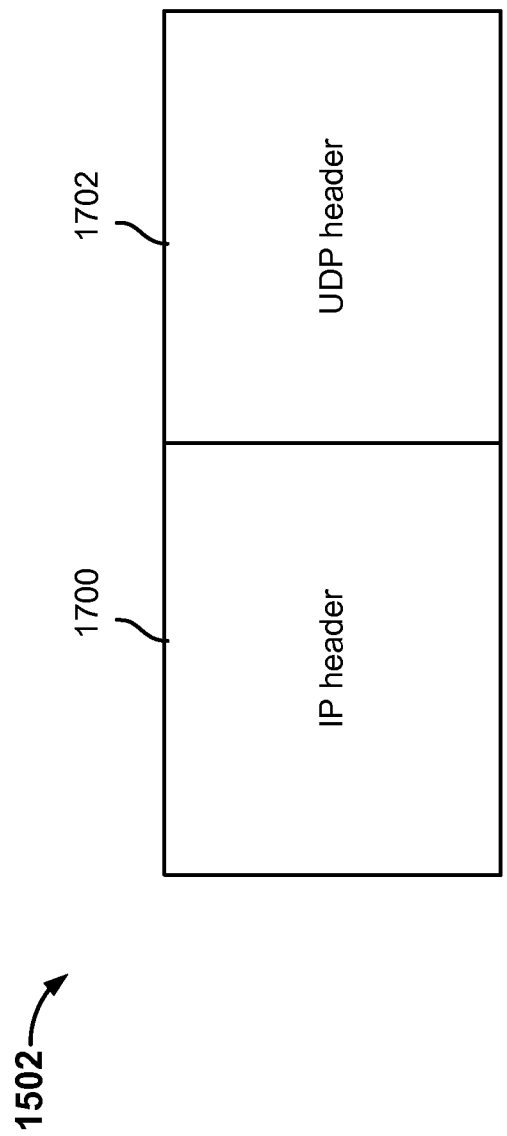
FIG. 17 is a diagram showing an example of a first header included in an encapsulation for a packet in accordance with some embodiments.

FIG. 17 is a diagram showing an example of a first header included in an encapsulation for a packet in accordance with some embodiments. The diagram shows an example of the L1 header of a packet encapsulation associated with a tunneling protocol specially configured for shared interfaces. In some embodiments, L1 header 1502 may be implemented using the example of FIG. 17. In some embodiments, the first header of process 1600 may be implemented using the example of FIG. 17. In the example, the L1 header includes IP header 1700 and UDP header 1702. In some embodiments, the L1 header includes data that indicates which data planes dispatcher compute unit performed the encapsulation and to which data plane compute unit the encapsulated packet is to be distributed from the data planes dispatcher compute unit. For example, such data indicating which data planes dispatcher compute unit performed the encapsulation and to which data plane compute unit the encapsulated packet is to be distributed from the data planes dispatcher compute unit may be included in IP header 1700. In some embodiments, each compute unit (regardless of assigned role) of a DVA is assigned an alphanumeric node ID (e.g., node 1, node 2, node 3) and each compute unit may be identified within the L1 header by their respective node IDs. In some embodiments, UDP header 1702 is the same UDP header that was included in the packet (e.g., Ethernet frame) to be encapsulated.

In some embodiments, the source port number (sometimes referred to as the "$S_{port}$") field (not shown in the example) of UDP header 1702 includes a data value that is determined based on a hash of one or more selected fields of the Ethernet frame (e.g., the Ethernet frame's payload). This source port number field of UDP header 1702 may be used to determine the underlying path of the network over which the encapsulated packet is to be sent from the data planes dispatcher compute unit to the determined data plane compute unit. By hashing selected fields of the Ethernet frame to use as the source port number field of UDP header 1702, there is a greater likelihood that different data values will be determined in the L1 header source port number fields for different packets to thereby introduce variability in the network path determination to prevent bottlenecking.

FIG. 18 is a diagram showing a first example of a second header included in an encapsulation for a packet in accordance with some embodiments. The example shows an example of the L2 header of a packet encapsulation. In some embodiments, L2 header 1504 may be implemented using the example of FIG. 18. In some embodiments, the second header of process 1600 may be implemented using the example of FIG. 18.

Generally, in some embodiments, the L2 header includes data that indicates how the packet is to be passed between different data plane compute units.

In the example of FIG. 18, the L2 header includes the following fields and their accompanying bit-size in parenthesis:

RSVD (24 bits): This field is indicated as a field that is to be kept for future use.

HANDOFF TYPE (4-bit): This field identifies what processing needs to be done when a packet is handed off from one compute unit to another compute unit. Examples of types of processing that may be represented by different data values in the "HANDOFF TYPE" field include whether to punt the packet to a next data plane compute unit and whether to broadcast the packet to all other data plane compute units (e.g., associated with the same shared interface).

HOOK (4-bit): This field identifies the module (e.g., netfilter hook) that was used in the previous data plane compute unit before the packet was handed off (e.g., passed to the next data plane compute unit).

TABLE (4-bit): This field indicates the IPtables table that was used on the previous data plane compute unit before the packet was handed off (e.g., passed to the next data plane compute unit).

TRR (1-bit): This field indicates whether each data plane compute unit that receives the packet should record its associated node ID within the L2 header of the encapsulation of the packet. As will be described below, in the event that the "TRR" field indicates that the data plane compute units traversed by the packet should record their respective node ID in the L2 header, the node ID values may be recorded within the Optional nid0 through Optional nidN fields shown in the example.

ERA (1-bit): This field indicates the current daisy chain era. As mentioned above, each time a new data plane compute unit is added to a DVA or an existing data plane compute unit is removed from the DVA, the hash table associated with distributing packets from a data planes dispatcher compute unit to a data plane compute unit is updated and so the era associated with the most up-to-date hash table also changes. The value in the "ERA" field reflects the era of the current most up-to-date hash table. For example, if the era value may be either "0" or "1," then in response to an update to the hash table (e.g., due to an addition or removal of a data plane compute unit), the era value may change from "0" to "1" or from "1" to "0." In some embodiments, the most up-to-date hash table and its associated era value is sent to each compute unit. However, the distribution of the most up-to-date hash table may take time to reach every compute unit. In some embodiments, each compute unit cannot be out of sync by more than one state so by checking the current value of the "ERA" field of a received encapsulated packet, the compute unit may determine whether its most recently received updated hash table is the most up-to-date hash table (if the compute unit's stored era value is the same as the value of the "ERA" field of the encapsulated packet) or if the most recently received updated hash table is no longer the most up-to-date hash table (if the compute unit's stored era value is not the same as the value of the "ERA" field of the encapsulated packet). This determination will allow the data plane compute unit that currently possesses the encapsulated packet to determine the correct hash table and also the correct, updated history table (that includes predecessor data plane compute units for various hash table buckets) to check for determining whether the current data plane compute unit should keep or punt the packet to another data plane compute unit that was previously assigned to receiving packets from the hash table bucket that currently maps to the current data plane compute unit. For example, if a data plane compute unit determines that it already has the most up-to-date hash table, then it may process the received encapsulated packet based on that table or if the data plane compute unit determines that it has not yet received the most up-to-date hash table, then it may wait until it receives the most up-to-date hash table before it processes the packet.

SNODE (12-bit): This field indicates the node ID of the data planes dispatcher compute unit that originally received (e.g., from a source external to the DVA), encapsulated, and distributed the packet.

IFID (8-bit): This field indicates the unique (within the DVA) ID of the shared interface to which the packet was addressed.

Optional nid0 through Optional nidN (16-bits each): As described above, each such field may record the node ID of each data plane compute unit that the packet has traversed (e.g., a data plane compute unit whose node ID is included within such a field may have previously punted the packet to another data plane compute unit).

In some embodiments, if the packet is of a particular type such as broadcast or address resolution protocol (ARP), then the packet may need to be passed to each data plane compute unit of the DVA. In the event the packet is of a broadcast/ARP type, in some embodiments, the data planes dispatcher compute unit that receives the packet, encapsulates, and distributes the packet to a first data plane compute unit, which then passes the encapsulated packet to a second data plane compute unit, and so forth until each data plane compute unit of the DVA has received the packet. In some embodiments, the sequence in which the encapsulated packet is passed from one data plane compute unit to another is based on the sequence in which data plane compute units were added to the DVA. For example, to determine the sequence in which data plane compute units were added, a data plane compute unit may refer to the value of the "ERA"

field and then the appropriate hash table and/or history table. Also, for example, each data plane compute unit that has received the broadcast/ARP packet may check the node IDs included in the Optional nid0 through Optional nidN fields to determine which data plane compute units have yet to receive the packet.

Figure 19:
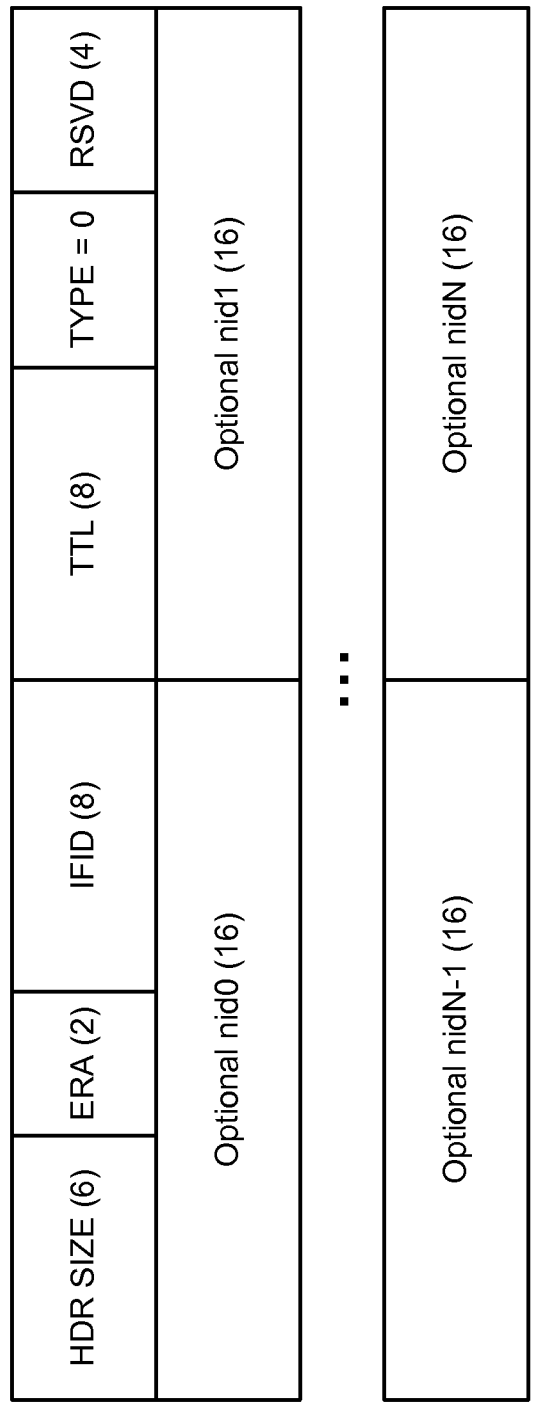
FIG. 19 is a diagram showing a second example of a second header included in an encapsulation for a packet in accordance with some embodiments.

FIG. 19 is a diagram showing a second example of a second header included in an encapsulation for a packet in accordance with some embodiments. The example shows an example of the L2 header of a packet encapsulation. In some embodiments, L2 header 1504 may be implemented using the example of FIG. 19. The example of FIG. 19 is an alternative way of implementing the L2 header from the example shown in FIG. 18. In some embodiments, the second header of process 1600 may be implemented using the example of FIG. 19.

In the example of FIG. 19, the L2 header includes some of the same fields that were included in the example of FIG. 18. Below are the fields and respective bit-size in parenthesis of the fields in the example of FIG. 19 that were not described in the example of FIG. 18:

HDR SIZE (6-bits): This field indicates the number of words (32-bits) to skip past the first word of the L2 header to get to the start of the inner layer 2 header.

TTL ("time to leave") (8-bits): This field indicates a predetermined value (e.g., the value of 255) that is set by the data planes dispatcher compute unit that received and encapsulated the packet. This value is decremented each time the encapsulated packet is forwarded from one data plane compute unit to another. For example, the data planes dispatcher compute unit may set this field to 255 for an ARP packet received from outside the DVA and the value is decremented by 1 as the packet traverses the global ARP chain. In some embodiments, once the "TTL" is decremented down to 0, then the packet is discarded.

FIG. 20 is a diagram showing a third example of a second header included in an encapsulation for a packet in accordance with some embodiments. The example shows an example of the L2 header of a packet encapsulation. In some embodiments, L2 header 1504 may be implemented using the example of FIG. 20. The example of FIG. 20 is an alternative way of implementing the L2 header from the examples shown in FIGS. 18 and 19. In some embodiments, the second header of process 1600 may be implemented using the example of FIG. 20.

The example of FIG. 20 is similar to that of the example of FIG. 19, except that the example of FIG. 20 includes additional fields (that have been previously discussed and so will not be described again) and also a different value ("1") for the "TYPE" field. In some embodiments, the example of the L2 header of FIG. 20 may be used when one data plane compute unit punts the encapsulated packet to another data plane compute unit (e.g., because this latter data plane compute unit is determined to be a predecessor to the former data plane compute unit and is also the data plane compute unit that is responsible for processing the network traffic flow associated with the packet). The "HOOK" field may represent to what point the packet has already been processed and the TYPE=1 field may indicate why the packet is being punted/passed.

In some embodiments, a 2 bytes VLAN header (which is not shown above) may be added as part of the encapsulation for a packet received at a data planes dispatcher compute unit. The VLAN header may be added because the extra 2 bytes realign the packet to a 4-byte boundary. Most adapters classify/process/extract the VLAN header before passing the packet to the operating system, so once the packet is first received by the ingress UTIF, it is faster to keep the VLAN header out of the inner packet than try to re-insert it there on its way to the data plane compute unit where the information is to be used.

Figure 21:
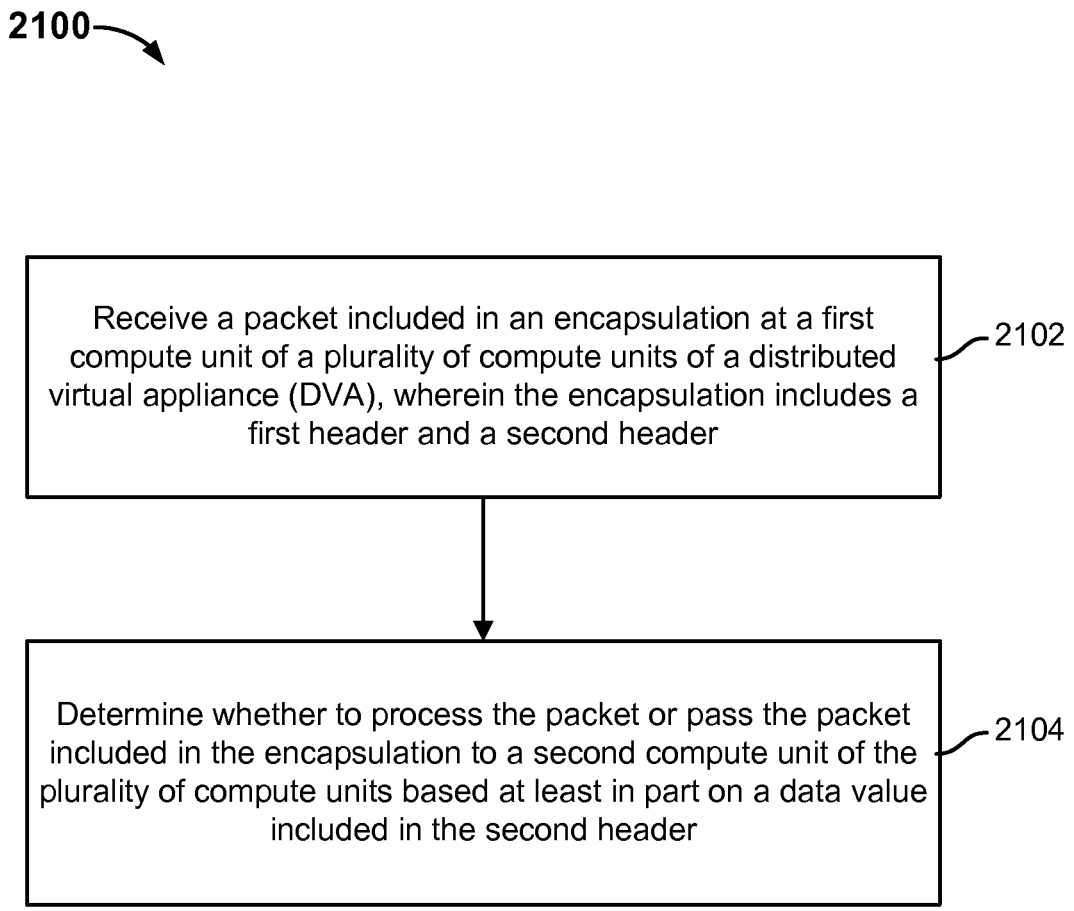
FIG. 21 is a flow diagram showing an example of a process of a data plane compute unit receiving an encapsulated packet in accordance with some embodiments.

FIG. 21 is a flow diagram showing an example of a process of a data plane compute unit receiving an encapsulated packet in accordance with some embodiments. In some embodiments, process 2100 may be implemented at DVA 600.

At 2102, a packet included in an encapsulation is received at a first compute unit of a plurality of compute units of a distributed virtual appliance (DVA), wherein the encapsulation includes a first header and a second header. For example, the compute unit that received the encapsulated packet may include a data plane compute unit of the DVA. In some embodiments, the first header and second header of the encapsulation may include the L1 header and L2 header, respectively. As described above, the L1 header may include data (e.g., a node ID) indicating the data plane compute unit to which the packet was originally distributed, and such data plane compute unit may or may not be the data plane compute unit at which the packet is currently received.

At 2104, it is determined whether to process the packet or pass the packet included in the encapsulation to a second compute unit of the plurality of compute units based at least in part on a data value included in the second header. For example, the data plane compute unit that received the encapsulated packet may check the L2 header to determine what processing has been previously performed on the packet (e.g., by checking the "HOOK" field of the L2 header) and if and to which other data plane compute unit it should punt the encapsulated packet to (e.g., by checking the "ERA" field of the L2 header). In some embodiments, the data plane compute unit that received the encapsulated packet may also perform a process such as process 800 to determine whether to keep or punt the packet.

Figure 22:
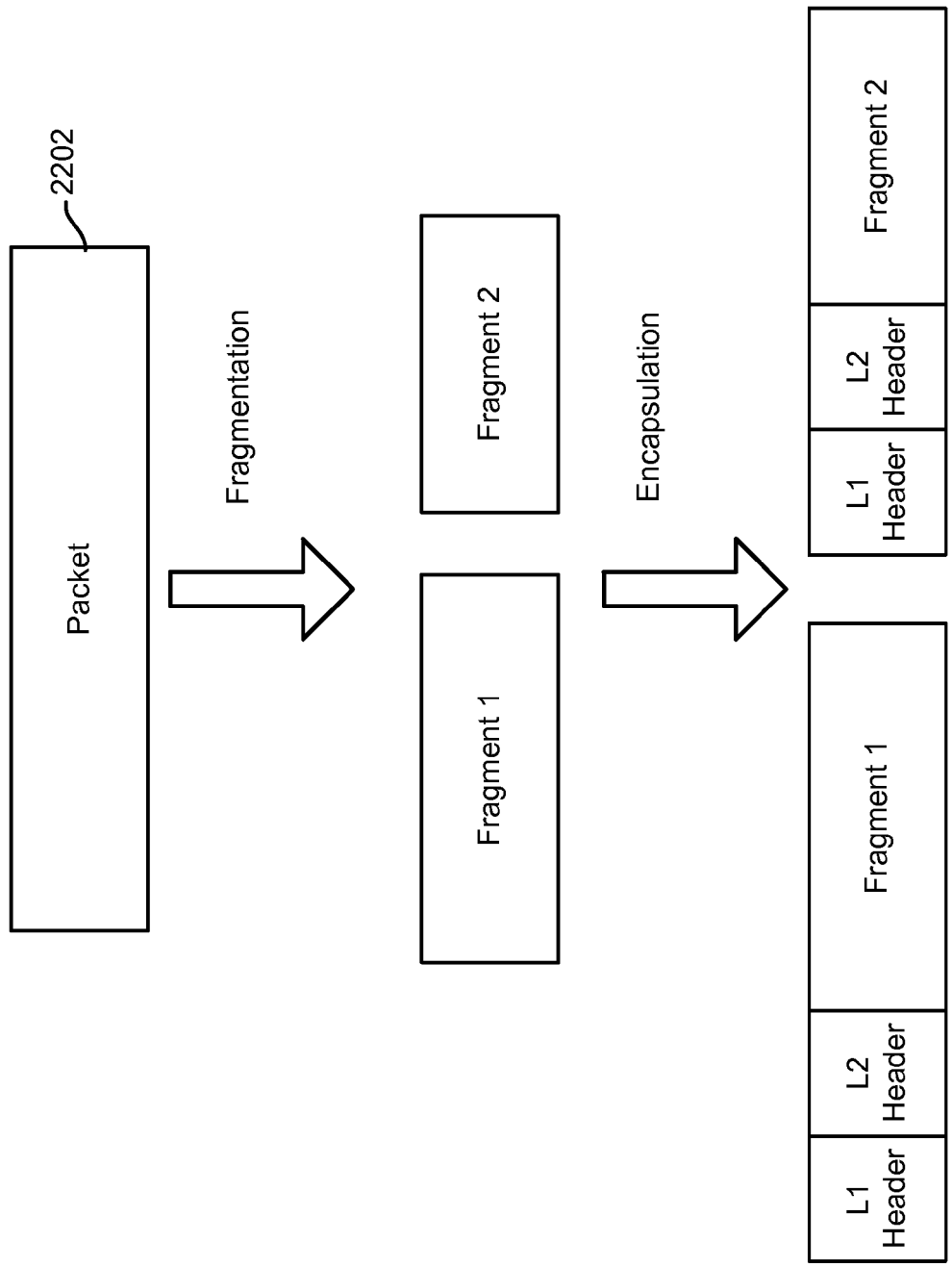
FIG. 22 is a diagram showing an example of performing fragmentation of a packet received at a shared interface in accordance with some embodiments.

FIG. 22 is a diagram showing an example of performing fragmentation of a packet received at a shared interface in accordance with some embodiments. As shown in the example, packet 2202 is a packet that is received (e.g., from a source external to the DVA) at a shared interface by a data planes dispatcher compute unit. In the example, it is determined that the size of packet 2202, either before or after encapsulation using a tunneling protocol associated with shared interfaces, exceeds a predetermined maximum size (e.g., 1500 octet) of a packet that can be transported. As such, it is determined that packet 2202 needs to be fragmented into smaller fragments that may be encapsulated and distributed to data plane compute units. As shown in the example, packet 2202 is fragmented into fragment 1 and fragment 2. Next, each fragment, fragment 1 and fragment 2, is individually encapsulated with an L1 header and an L2 header. In some embodiments, each fragment includes an L1 header and each L1 header includes a UDP header (whereas in previous fragmentation techniques, only one of multiple related fragments is given a UDP header). While not shown in the example, data is also included within the respective L2 headers of fragment 1 and fragment 2 that indicates the relation/association between fragment 1 and fragment 2. In some embodiments, it is checked whether encapsulated fragment 1 and encapsulated fragment 2 each exceeds the predetermined maximum size. If either one of the encapsulated fragments exceeds the predetermined maximum size, then the fragment associated with exceeding the maximum size may be fragmented again and each of its fragments encapsulated until each encapsulated fragment is determined to be below the predetermined maximum size. In the example, assume that it is determined that each of the encapsulated fragments is below the predetermined maximum size, and so encapsulated fragment 1 (i.e., fragment 1 with prepended L1 and L2 headers) and encapsulated fragment 2 (i.e., fragment 2 with prepended L1 and L2 headers) may be distributed to a data plane compute unit. The receiving data plane compute unit may determine that the two encapsulated fragments are related (e.g., based on the data included in the L2 header of each encapsulated fragment) and may be reassembled to generate the original packet, packet 2202.

However, in some embodiments, fragmentation is not handled using the disclosed tunneling protocol (e.g., in such embodiments, packet 2202 would not have been fragmented and would have remained as one packet such as encapsulated packet 1500). In some embodiments, fragmentation is performed at the UDP layer and uses the disclosed encapsulation, which would result in a first packet comprising the L1 header, the L2 header, and a first portion of packet 1506 of FIG. 15 and a second packet comprising the L1 header and the remaining portion of packet 1506. In some embodiments, fragmentation is performed at the IP level, thus resulting in an IP packet comprising the L1 header, the L2 header, and a first portion of packet 1506 of FIG. 15 and a second IP packet comprising an IP header and the remaining portion of packet 1506. In some embodiments, IP packets are transmitted with the "Don't fragment" bit always set (at the IP level), in which case packets that are larger than the maximum transmission unit (MTU) on any link on the path to their destination will be discarded by the router transmitting on that link. In some embodiments, MTU path discovery is used to make sure that generated packets do not exceed the MTU on any of the links traversed on the way to their destination.

Figure 23:
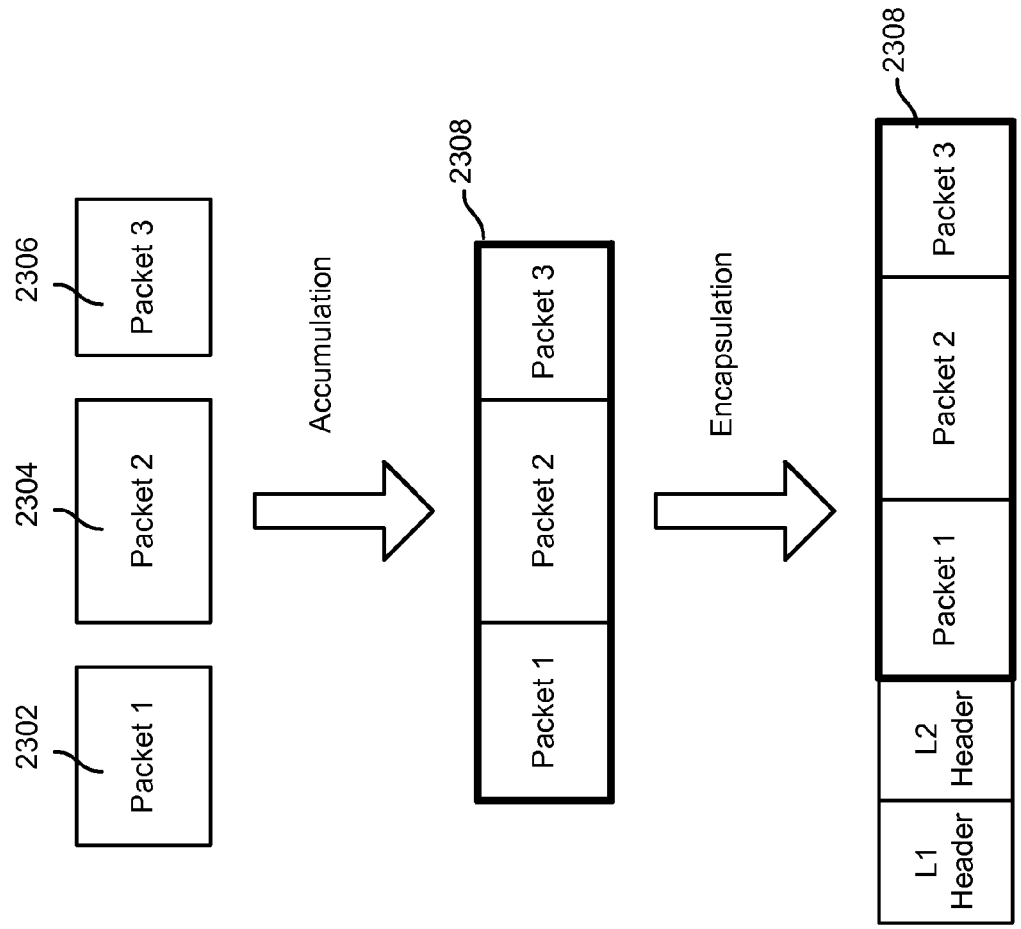
FIG. 23 is a diagram showing an example of performing accumulation of multiple packets at a shared interface in accordance with some embodiments.

FIG. 23 is a diagram showing an example of performing accumulation of multiple packets at a shared interface in accordance with some embodiments. As shown in the example, packets 2302, 2304, and 2306 are packets that are each received (e.g., from a source external to the DVA) at a shared interface by a data planes dispatcher compute unit. In some embodiments, an accumulation threshold size is configured such that packets of sizes that fall below the accumulation threshold size are accumulated and combined. Then the combined packet is encapsulated with an L1 header and an L2 header before being distributed to a data plane compute unit. In some embodiments, an encapsulation threshold may be configured such that if the combined sizes of the packets accumulated so far exceed the encapsulation threshold but fall below the predetermined maximum size, then the accumulated packets are to be combined, encapsulated, and distributed. As shown in the example, packets 2302, 2304, and 2306 each fall below the accumulation threshold. However, the combined size of packets 2302, 2304, and 2306 exceed the encapsulation size but fall below the predetermined maximum size. Thus, accumulated packets 2302, 2304, and 2306 may be combined into combined packet 2308, which may then be encapsulated with an L1 header and an L2 header. In some embodiments, data indicating that combined packet 2308 is actually a combination of three independent packets may be included within one of the L1 header and the L2 header. Encapsulated combined packets (i.e., combined packet 2308 prepended by the L1 header and the L2 header) may be distributed to a data plane compute unit. The receiving data plane compute unit may determine that the encapsulated packet (e.g., based on the data included in a header of the encapsulated packet) includes three independent packets, packets 2302, 2304, and 2306.

Figure 24:
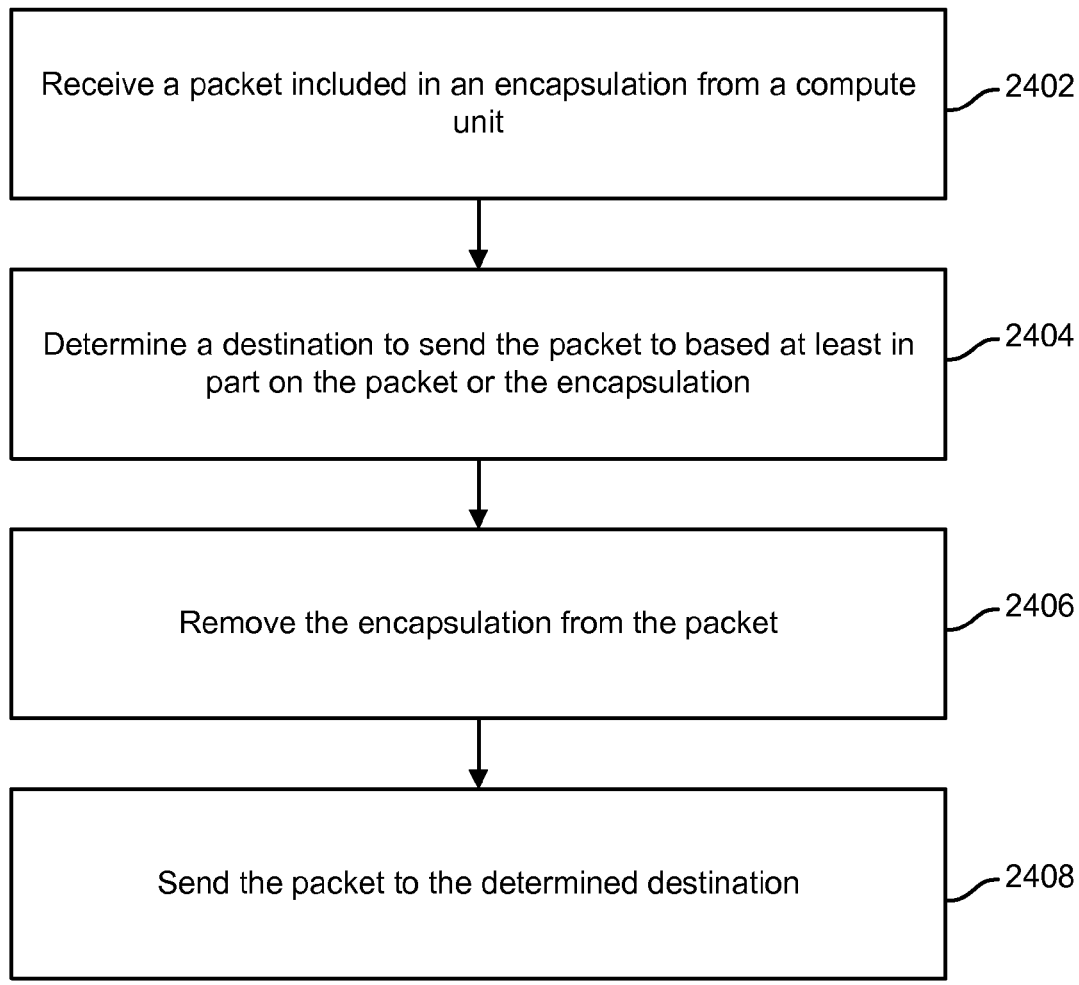
FIG. 24 is a flow diagram showing an example of a process for sending a packet out from a shared interface in accordance with some embodiments.

FIG. 24 is a flow diagram showing an example of a process for sending a packet out from a shared interface in accordance with some embodiments. In some embodiments, process 2400 may be implemented at DVA 600.

At 2402, a packet included in an encapsulation is received from a compute unit. In some embodiments, the packet is sent from a data plane compute unit (e.g., after the encapsulated packet had been processed or determined that it could not be processed) and received at a data planes dispatcher compute unit. Both the data plane compute unit and the data planes dispatcher compute unit are associated with a shared interface of a DVA.

At 2404, a destination to which to send the packet is determined based at least in part on the packet or the encapsulation. In some embodiments, a destination external to the DVA to send a processed packet to is included within either the encapsulation of the packet or the packet itself.

At 2406, the encapsulation is removed from the packet. In some embodiments, before the packet is sent out of the DVA and to a destination external to the DVA, the data planes dispatcher compute unit strips off the encapsulation.

At 2408, the packet is sent to the determined destination. The packet without the encapsulation is then sent out to the external destination. The packet will include the source address associated with the shared interface.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing a shared network interface, comprising:
   generating, by a computer processor, a distribution data structure that maps a plurality of network traffic flows to a set of compute units that share a shared network interface, wherein each packet of each of the network traffic flows has an original header containing information that associates the packet with a particular network traffic flow, and wherein the distribution data structure is modified in response to a compute unit being added to or removed from the set of compute units;
   generating, by the processor, history information that includes predecessor mappings of network traffic flows to compute units that preceded the current distribution data structure such that, for each network traffic flow whose assigned compute unit has changed over time, the history information provides a sequential chain of compute units from a currently assigned compute unit specified by the current distribution data structure to an original compute unit responsible for managing the network traffic flow;
   encapsulating, by the processor, an incoming packet received at the shared network interface with a first header that indicates the currently assigned compute unit to which the incoming packet is to be initially distributed, the currently assigned compute unit being selected based on the distribution data structure's mapping of the particular network traffic flow indicated by the incoming packet's original header to the currently assigned compute unit; and
   subsequently encapsulating the incoming packet with a second header that enables the incoming packet to be punted through the chain of compute units from the currently assigned compute unit to the original compute unit responsible for managing the particular network traffic flow with which the incoming packet is associated based on the history information.

2. The method of claim 1, further comprising distributing the encapsulated incoming packet to at least one of the compute units.

3. The method of claim 1, wherein the incoming packet is encapsulated with the first header indicating the currently assigned compute unit to which the incoming packet is to be distributed irrespective of whether the currently assigned compute unit is responsible for managing the particular network traffic flow to which the incoming packet is associated.

4. The method of claim 1, wherein the distribution data structure specifies the assigned compute unit to which the incoming packet is to be initially distributed based on a hash function generated from information extracted from the original header of the incoming packet.

5. The method of claim 4, wherein the history information comprises a history table of predecessor mappings of network traffic flows to compute units.

6. The method of claim 1, further comprising distributing the encapsulated incoming packet to at least one of the compute units over a secure tunnel.

7. The method of claim 1, wherein the set of compute units are associated with a same media access control (MAC) address corresponding to the shared network interface.

8. A system of providing a shared network interface, comprising:
a computer processor configured to:
generate a distribution data structure that maps a plurality of network traffic flows to a set of compute units that share a shared network interface, wherein each packet of each of the network traffic flows has an original header containing information that associates the packet with a particular network traffic flow, and wherein the distribution data structure is modified in response to a compute unit being added to or removed from the set of compute units;
generate history information that includes predecessor mappings of network traffic flows to compute units that preceded the current distribution data structure such that, for each network traffic flow whose assigned compute unit has changed over time, the history information provides a sequential chain of compute units from a currently assigned compute unit specified by the current distribution data structure to an original compute unit responsible for managing the network traffic flow;
encapsulate an incoming packet received at the shared network interface with a first header that indicates the currently assigned compute unit to which the incoming packet is to be initially distributed, the currently assigned compute unit being selected based on the distribution data structure's mapping of the particular network traffic flow indicated by the incoming packet's original header to the currently assigned compute unit; and
subsequently encapsulate the incoming packet with a second header that enables the incoming packet to be punted through the chain of compute units from the currently assigned compute unit to the original compute unit responsible for managing the particular network traffic flow with which the incoming packet is associated based on the history information.

9. The system of claim 8, wherein at least one of the compute units in the set of compute units comprises a virtual machine (VM).

10. The system of claim 8, wherein the shared network interface is remote from each of the of compute units in the set of compute units.

11. The system of claim 8, wherein the processor is further configured to distribute the encapsulated incoming packet to at least one of the compute units.

12. The system of claim 8, wherein the processor is configured to encapsulate the incoming packet with the first header indicating the currently assigned compute unit to which the incoming packet is to be distributed irrespective of whether the currently assigned compute unit is responsible for managing the particular network traffic flow to which the incoming packet is associated.

13. The system of claim 8, wherein the distribution data structure specifies the assigned compute unit to which the incoming packet is to be initially distributed based on a hash function generated from information extracted from the original header of the incoming packet.

14. The system of claim 13, wherein the shared network interface comprises a dispatcher compute unit.

15. The system of claim 8, wherein history information comprises a history table of predecessor mappings of network traffic flows to compute units.

16. The system of claim 8, wherein the processor is configured to remove an encapsulation from an encapsulated outgoing packet originating from one of the compute units to be sent out via the shared network interface.

17. The system of claim 8, wherein the processor is further configured to distribute the encapsulated incoming packet to at least one of the compute units over a secure tunnel.

18. The system of claim 8, wherein the first header includes an IP header.

19. The system of claim 8, wherein the first header includes a user datagram protocol (UDP) header.

20. The system of claim 8, wherein the first header includes an IP address.

21. The system of claim 8, wherein the set of compute units are associated with a same media access control (MAC) address corresponding to the shared network interface.

22. A computer program product for providing a shared network interface, the computer program product being embodied in a non-transitory computer readable memory and comprising instructions for:
generating a distribution data structure that maps a plurality of network traffic flows to a set of compute units that share a shared network interface, wherein each packet of each of the network traffic flows has an original header containing information that associates the packet with a particular network traffic flow, and wherein the distribution data structure is modified in response to a compute unit being added to or removed from the set of compute units;
generating history information that includes predecessor mappings of network traffic flows to compute units that preceded the current distribution data structure such that, for each network traffic flow whose assigned compute unit has changed over time, the history information provides a sequential chain of compute units from a currently assigned compute unit specified by the current distribution data structure to an original compute unit responsible for managing the network traffic flow;

encapsulating an incoming packet received at the shared network interface with a first header that indicates the currently assigned compute unit to which the incoming packet is to be initially distributed, the currently assigned compute unit being selected based on the distribution data structure's mapping of the particular network traffic flow indicated by the incoming packet's original header to the currently assigned compute unit; and subsequently encapsulating the incoming packet with a second header that enables the incoming packet to be punted through the chain of compute units from the currently assigned compute unit to the original compute unit responsible for managing the particular network traffic flow with which the incoming packet is associated based on the history information.

* * * * *